(12) United States Patent
Ubukata

(10) Patent No.: US 11,474,084 B2
(45) Date of Patent: Oct. 18, 2022

(54) MASS SPECTROMETRY APPARATUS, GAS CHROMATOGRAPH-MASS SPECTROMETRY APPARATUS, AND FLASHING CURRENT CONTROL APPARATUS

(71) Applicant: JEOL Ltd., Tokyo (JP)

(72) Inventor: Masaaki Ubukata, Tokyo (JP)

(73) Assignee: JEOL Ltd., Tokyo (JP)

( * ) Notice: Subject to any disclaimer, the term of this patent is extended or adjusted under 35 U.S.C. 154(b) by 477 days.

(21) Appl. No.: 16/689,397

(22) Filed: Nov. 20, 2019

(65) Prior Publication Data

US 2020/0158699 A1 May 21, 2020

(30) Foreign Application Priority Data

Nov. 21, 2018 (JP) .............................. JP2018-218621

(51) Int. Cl.
*H01J 49/10* (2006.01)
*G01N 30/72* (2006.01)
*H01J 49/04* (2006.01)

(52) U.S. Cl.
CPC ...... *G01N 30/7206* (2013.01); *H01J 49/0422* (2013.01); *H01J 49/0486* (2013.01); *H01J 49/10* (2013.01)

(58) Field of Classification Search
CPC .............. G01N 30/7206; H01J 49/0422; H01J 49/0486; H01J 49/10; H01J 49/16
USPC ........................................ 250/281, 282, 288
See application file for complete search history.

(56) References Cited

U.S. PATENT DOCUMENTS

| 5,644,129 A * | 7/1997 | Hsu ..................... G01N 33/2829 250/282 |
| 5,664,129 A | 7/1997 | Hsu et al. |
| 2007/0181796 A1* | 8/2007 | Hsu ........................ G01N 27/62 250/282 |
| 2015/0200083 A1* | 7/2015 | Brown ................ H01J 49/4245 250/288 |

FOREIGN PATENT DOCUMENTS

| GB | 1187376 | 4/1970 |
| JP | S5944756 A | 3/1984 |
| JP | H03129639 A | 6/1991 |
| JP | 2000230920 A | 8/2000 |
| JP | 201568678 A | 4/2015 |

(Continued)

OTHER PUBLICATIONS

Office Action issued in JP 2018-218621 dated Nov. 17, 2020.
(Continued)

*Primary Examiner* — Michael Maskell
(74) *Attorney, Agent, or Firm* — The Webb Law Firm

(57) ABSTRACT

In a mass spectrometry apparatus, an electric field is applied to an injected specimen to ionize the specimen, and mass spectrometry of the specimen is performed. In an emitter which ionizes the specimen, a flashing process to increase a temperature of the emitter is repeatedly performed at a short-time interval during an injection period of the specimen. A flashing current controller controls a flashing current value to be applied to the emitter to increase, in a long term, a flashing temperature which the emitter reaches in the flashing process.

3 Claims, 17 Drawing Sheets

(56) References Cited

FOREIGN PATENT DOCUMENTS

JP          2015068678 A   *   4/2015
JP           6045467 B2       11/2016

OTHER PUBLICATIONS

Gross, Jurgen H., Mass Spectrometry—A Textbook, Chapter 8.3 Field emitters, Jan. 1, 2004, pp. 358-361.
Extended European Search Report issued in EP19210184.8 dated Apr. 22, 2020.

* cited by examiner

| n-Alkane | B.P. (°C) | R.T. (min) | TIC peak intensity |||||||||
| --- | --- | --- | --- | --- | --- | --- | --- | --- | --- | --- | --- |
| | | | 5mA | 10mA | 15mA | 20mA | 25mA | 30mA | 35mA | 40mA | 45mA | 50mA |
| C10 | 174.1 | 2.51 | 1,842,380 | 1,883,030 | 1,681,699 | 1,363,930 | 1,038,545 | 869,739 | 506,520 | 339,102 | 174,761 | 134,045 |
| C12 | 216.2 | 4.38 | 4,237,300 | 4,100,010 | 3,015,907 | 2,081,988 | 1,225,292 | 818,857 | 621,407 | 423,360 | 225,523 | 119,197 |
| C14 | 253 | 6.14 | 7,423,716 | 8,852,207 | 6,852,207 | 5,808,981 | | 1,287,423 | 783,925 | 821,879 | 392,200 | 214,427 |
| C16 | 287 | 7.71 | 4,239,936 | 4,809,870 | 4,809,870 | 5,597,665 | 5,460,120 | 3,733,106 | 931,547 | 633,666 | 392,205 | 192,673 |
| C18 | 317 | 9.14 | 2,043,334 | 2,352,446 | 2,352,446 | 2,777,445 | 3,133,643 | 3,298,899 | 1,378,882 | 630,049 | 324,849 | 178,486 |
| C20 | 342.7 | 10.43 | 1,264,277 | 1,494,352 | 1,494,352 | 1,672,791 | 1,863,188 | 2,353,917 | 1,637,623 | 872,087 | 269,613 | 138,880 |
| C22 | 369 | 11.63 | 894,658 | 918,683 | 918,683 | 1,043,758 | 1,250,800 | 1,512,050 | 1,129,862 | 1,552,842 | 251,039 | 102,518 |
| C24 | 391.3 | 12.74 | 767,051 | 708,635 | 708,635 | 737,810 | 874,489 | 1,004,553 | 834,076 | 1,339,378 | 247,391 | 75,256 |
| C26 | 412.2 | 13.72 | 612,500 | 617,596 | 617,596 | 591,000 | 582,104 | 592,798 | 391,939 | 809,102 | 284,108 | 53,621 |
| C28 | 431.6 | 14.68 | 493,178 | 532,257 | 532,257 | 478,892 | 471,021 | 483,283 | 331,227 | 357,758 | 239,725 | 69,761 |
| C30 | 449.7 | 15.54 | 305,764 | 323,328 | 323,328 | 374,460 | 303,236 | 258,226 | 167,224 | 103,963 | 75,181 | 29,163 |
| C32 | 467 | 16.38 | 301,592 | 331,845 | 306,989 | 378,964 | 261,546 | 306,791 | 193,973 | 121,753 | 96,832 | 80,302 |
| C34 | | 17.16 | 330,845 | 287,525 | 287,525 | 394,392 | 297,544 | 361,657 | 209,863 | 110,377 | 88,850 | 68,801 |
| C36 | | 17.92 | 234,095 | 208,368 | 208,368 | 290,757 | 198,522 | 252,377 | 174,087 | 46,515 | 29,827 | 29,573 |
| C38 | | 18.63 | | | | | | 184,908 | 90,958 | 25,202 | 15,243 | 15,243 |
| C40 | 522 | 19.55 | | | | | | 90,589 | 42,809 | 7,098 | 10,592 | 10,592 |

FIG.15

| n-Alkane | FLASHING CURRENT VALUE: 40mA | | | |
|---|---|---|---|---|
| | FLASHING TIME | | | |
| | 30msec | 40msec | 50msec | 60msec |
| C10 | 339,102 | 213,241 | 120,823 | 72,336 |
| C12 | 423,360 | 229,746 | 111,817 | 55,690 |
| C14 | 521,873 | 335,157 | 164,047 | 88,449 |
| C16 | 638,666 | 349,794 | 209,396 | 83,379 |
| C18 | 633,044 | 277,430 | 197,577 | 78,178 |
| C20 | 872,087 | 231,974 | 128,983 | 76,392 |
| C22 | 1,552,849 | 219,175 | 108,394 | 61,483 |
| C24 | 1,339,379 | 253,620 | 75,469 | 49,719 |
| C26 | 609,102 | 392,100 | 47,019 | 39,344 |
| C28 | 357,758 | 276,359 | 55,016 | 24,460 |
| C30 | 103,963 | 81,757 | 28,980 | 5,937 |
| C32 | 121,763 | 97,180 | 53,335 | 10,413 |
| C34 | 110,377 | 100,614 | 93,758 | 19,540 |
| C36 | 46,515 | 34,187 | 34,771 | 19,880 |
| C38 | 25,302 | 17,033 | 16,774 | 14,661 |
| C40 | 7,098 | 6,646 | 10,989 | 15,935 |

FIG.16

MASS SPECTROMETRY APPARATUS, GAS CHROMATOGRAPH-MASS SPECTROMETRY APPARATUS, AND FLASHING CURRENT CONTROL APPARATUS

CROSS-REFERENCE TO RELATED APPLICATION

This application claims priority to Japanese Patent Application No. 2018-218621 filed Nov. 21, 2018, the disclosure of which is hereby incorporated by reference in its entirety.

BACKGROUND OF THE INVENTION

Field of the Invention

The present disclosure relates to a mass spectrometry apparatus, a gas chromatograph-mass spectrometry apparatus, and a flashing current control apparatus.

Description of Related Art

Among mass spectrometry apparatuses, there exists a mass spectrometry apparatus which ionizes a specimen by a field ionization (FI) method. The FI method is a method in which a strong electric field is applied to an emitter, and the specimen is ionized utilizing the tunneling effect, and allows performance of soft ionization in which fragmentation does not tend to occur. In the FI method, a gasified specimen is introduced into an ion source. For example, after the gasified specimen is separated by gas chromatograph (GC), the separated component can be introduced into the ion source and can be ionized. In addition, in order to remove specimen adhered on a surface of the emitter, flashing is repeatedly performed during an injection period of the specimen, in which electricity is applied to the emitter for a short period of time, to heat the emitter (for example, refer to JP 2015-68678 A).

In the FI method, in general, the efficiency of ionization of the injected specimen is reduced in the state where the emitter is heated. However, if the emitter is not heated in order to prevent the reduction of the ionization efficiency, a problem arises in which the specimen is adhered on the surface of the emitter, resulting in reduction of the analysis sensitivity.

An advantage of the present disclosure lies in realization of a mass spectrometry apparatus which performs flashing of the emitter in which both the ionization efficiency and the analysis sensitivity are improved.

SUMMARY OF THE INVENTION

According to one aspect of the present disclosure, there is provided a mass spectrometry apparatus comprising: an emitter that applies an electric field to an injected specimen, to ionize the specimen; a flashing processor that repeatedly performs a flashing process to increase a temperature of the emitter at a short-time interval during an injection period of the specimen; and a mass spectrometry unit that performs mass spectrometry of the specimen ionized by the emitter, wherein the flashing processor increases, during the injection period and in a long term, a flashing temperature which the emitter reaches during the temperature increasing process.

According to another aspect of the present disclosure, there is provided a gas chromatograph-mass spectrometry apparatus comprising: the mass spectrometry apparatus; and a gas chromatograph that includes a column in which a temperature is controlled, and that sequentially injects the specimen separated by the column into the mass spectrometry apparatus, wherein the flashing processor increases the amount of the electric power of the flashing current in the long term according to a temperature control pattern of the column.

According to another aspect of the present disclosure, there is provided a flashing current control apparatus which is a control apparatus of an emitter which applies an electric field to an injected specimen, to ionize the specimen, comprising: a flashing processor that repeatedly performs, at a short-time interval during an injection period of the specimen, a flashing process to increase a temperature of the emitter by applying a flashing current to the emitter, wherein the flashing processor increases an amount of electric power of the flashing current during the injection period and in a long term.

According to various aspects of the present disclosure, higher efficiency of the ionization of the specimen and a higher sensitivity of analysis can be achieved as compared to a case where the flashing temperature of the emitter is set constant.

BRIEF DESCRIPTION OF THE DRAWINGS

Embodiment(s) of the present disclosure will be described based on the following figures, wherein:

FIG. 15 is a diagram showing a TICC peak intensity when a flashing current value is changed; and FIG. 16 is a diagram showing a TICC peak intensity when a flashing time is changed.

Figure 1:
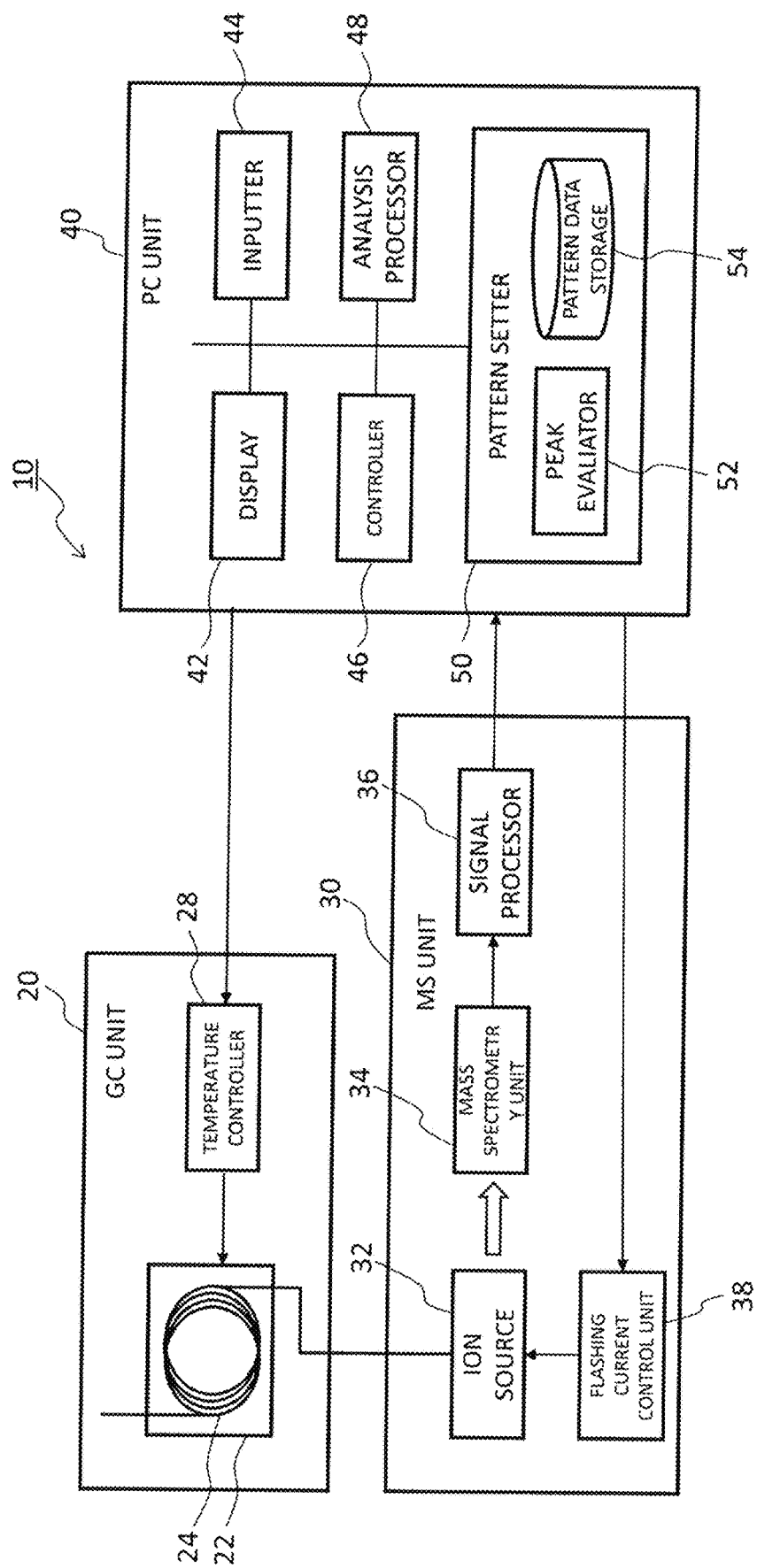
FIG. 1 is a schematic structural diagram of a gas chromatograph-mass spectrometry apparatus according to an embodiment of the present disclosure.

DESCRIPTION OF THE INVENTION (A) Overview of Embodiment

A mass spectrometry apparatus according to an embodiment of the present disclosure comprises an emitter, a flashing processor, and a mass spectrometry unit. The emitter is a constituting element of an ion source which ionizes a specimen by the FI method, and applies an electric field to an injected specimen, to ionize the specimen.

The flashing processor repeats a flashing process to increase a temperature of the emitter at a short-time interval during an injection period of the specimen. The injection period refers to an overall period in which the specimen is injected for a series of measurements. In the injection period, a process may be applied in which the injection of the specimen is temporarily stopped during a time period in which accumulation is not performed.

In the FI method, when a surface of the emitter is soiled by adhesion of the specimen or impurities, an amount of generated ions is reduced. Thus, the flashing of the emitter is performed in order to reduce the amount of adhesion of the specimen and the impurities. In the flashing process, normally, a current of a few mA to a few tens of mA is applied to the emitter at a certain interval (by a constant-current power supply), to heat the surface of the emitter to a high temperature, to thereby suppress adhesion of substances onto the surface of the emitter. Alternatively, other heating means may be employed such as illuminating a laser onto the emitter to heat the emitter. In the flashing process, the temperature of the emitter is increased by, for example, 10° C. or more, 30° C. or more, 100° C. or more, or 300° C. or more. Because the emitter has a small size and a corresponding small heat capacity, after the emitter is set at the high temperature, the emitter is quickly cooled by heat conduction to inert gas, heat radiation corresponding to the temperature, or the like, but alternatively, a cooling mechanism may be provided to actively cool the emitter. A time interval of flashing is set to a short time in comparison to a typical injection period of the specimen (for example, one minute to one hour). The specific time interval may vary depending on properties of the emitter, an amount of injection of the specimen, and a boiling point of the specimen, or the like, and may be a short-time interval such as, for example, from once every 0.05 second to once every 10 seconds. The time interval of flashing may be the same interval every time or may be an unequal interval. Alternatively, a control may be applied so that a small current is constantly applied to the emitter to maintain the temperature of the emitter at a suitable high temperature.

The mass spectrometry unit performs a mass spectrometry of the specimen ionized by the emitter. No particular limitation is imposed on a principle of the mass spectrometry, and various apparatuses may be used such as a time-of-flight type apparatus, a magnetic field sector type apparatus, a linear quadrupole type apparatus, a three-dimensional quadrupole ion trap apparatus, or a Fourier transform ion cyclotron resonance spectrometry type apparatus. Signals obtained by the mass spectrometry are processed by a computer.

The flashing processor increases, in a long term, the flashing temperature to which the emitter reaches during the temperature increase, in the injection period. The flashing temperature refers to a maximum temperature reached by the emitter in the flashing process of each time. The flashing temperature is set so that the temperature is increased in a long-term time scale over an entirety of the injection period. Because of this, the flashing temperature is set at a higher temperature during a later stage in comparison to an initial stage of the injection period, in time average.

In general, when the flashing temperature is set high, while the ionization efficiency of the specimen at the emitter is reduced, the specimen having a high boiling point and adhered to the emitter becomes easier to remove, and the sensitivity of analysis is thereby improved. Therefore, when the flashing temperature is increased in the long term during the injection period of the specimen, a possibility that an analysis environment suited for the properties of the specimen is formed becomes high, and an analysis result can be expected in which both the ionization efficiency of the specimen and the analysis sensitivity are improved.

As an ionization method similar to the FI method, there is known a field desorption (FD) method. In the FD method, the specimen is directly mounted on the emitter in advance such as by applying the specimen, and the specimen is heated to remove the specimen as ions or is heated, evaporated, and ionized by an electric field in the evaporated state. In the FD method, normally, the temperature of the emitter is increased during the process of the ionization to promote removal of the specimen, but this temperature increase is not repeated at a short-time interval as in the FI method, and is rather performed constantly. In addition, in the FD method, because a specimen mixed in a specimen is detected, it is not necessary to increase the detection sensitivity of the specimen as in the FI method. The temperature increase of the emitter in the FD method completely differs from that of the FI method in a realized format and object for the process.

According to an embodiment of the present disclosure, the specimen which is separated by a chromatograph may be sequentially injected into an ion source which includes the emitter. In this structure, a plurality of components included in the specimen are separated according to a suitable property by the chromatograph such as a gas chromatograph, and are sequentially injected to the emitter. For example, when separation by the boiling point is performed, the components to be sequentially injected change from those having lower boiling points to those having higher boiling points. Alternatively, for example, when the separation is performed by polarity, the components to be sequentially injected change from those having lower polarities to those having higher polarities. When such a separation property is taken into consideration, the flashing temperature necessary for removing the specimen adhered to the emitter may be considered in many cases to be low at the initial stage of the injection of the specimen, and to be increased at a later stage of the injection. Therefore, by increasing the flashing temperature in the long term during the injection period of the specimen, it becomes possible to perform the flashing process suited for the specimen.

According to another embodiment of the present disclosure, the flashing processor may perform the flashing process by applying a flashing current to the emitter, and may increase the flashing current in the long term by increasing an amount of electric power of the flashing current in a long term. The temperature increase of the emitter can be simply performed by applying a current to the emitter and heating the emitter by its Joule's heat. In this case, the long-term temperature increase is realized by increasing the Joule's heat. Because the Joule's heat is given by the amount of electric power supplied to the emitter (time-accumulated value of the electric power), the amount of electric power of the flashing current is increased in the long term.

According to another embodiment of the present disclosure, the flashing processor may stepwise increase the amount of the electric power of the flashing current in the long term. The stepwise increase refers to a step-functional increase to rapidly increase the value from a certain value to another value in a short period of time. This increase may be performed only once during the injection period of the specimen, or may be performed a plurality of times. In this setting, a period can be secured in which the amount of electric power of the flashing current is set constant and ionization can be performed under the same conditions, and, at the same time, the long-term increase of the amount of the electric power of the flashing current can be realized.

Alternatively, for example, the flashing processor may continuously increase the amount of the electric power of the flashing current in the long term. The continuous increase refers to a continuous-functional increase to gradually increase the value with time. The increase may be linear with respect to time or non-linear with respect to time. In this setting, because the amount of electric power of the flashing current gradually changes, it becomes possible to avoid a rapid change of the ionization condition at the emitter.

According to another embodiment of the present disclosure, the flashing processor may increase the amount of the electric power of the flashing current in the long term while varying the amount of the electric power of the flashing current in a time interval longer than the short-time interval described above and shorter than the injection period. In this setting, while the amount of electric power of the flashing current increases in the long term, temperature reduction may appear once or a plurality of times in a time scale of a medium term, during the process. For example, when the specimen to be injected is separated by the polarity and is not necessarily separated based on the boiling point, the amount of electric power of the flashing current may be varied in the medium-term scale, so that both the ionization efficiency of the specimen and the analysis sensitivity can be improved.

According to another embodiment of the present disclosure, the apparatus may further comprise: a presenter that presents to a user a plurality of electric power increasing patterns for increasing the amount of the electric power of the flashing current in the long term; and a receiver that receives an electric power increasing pattern selected by the user, and the flashing processor may increase the amount of the electric power of the flashing current in the long term according to the electric power increasing pattern received by the receiver. When the user is not familiar with the handling of the mass spectrometry apparatus, the user may be unable to suitably set the increase setting of the amount of electric power of the flashing current. Thus, a configuration becomes effective in which a plurality of electric power increasing patterns are presented to the user, to allow the user to select a pattern. In addition to the electric power increasing pattern, a pattern to maintain the amount of electric power constant may also be presented to the user. Alternatively, a priority order, which is a recommended order, may be attached to the plurality of electric power increasing patterns which are presented. The priority order may be determined, for example, based on the properties of the specimen to be injected, the properties of the chromatograph prior to the injection, or the like. Alternatively, the priority order may be determined based on a result of actual analysis of the same specimen or a similar specimen.

According to another embodiment of the present disclosure, the apparatus may further comprise a selector that evaluates a temporal peak of the ionized specimen obtained by the mass spectrometry unit, and that selects an electric power increasing pattern for increasing the amount of the electric power of the flashing current in the long term. The evaluation of the temporal peak of the specimen refers to a qualitative evaluation or a quantitative evaluation of a detected peak of an intensity of ions (ion number) appearing on a time axis. More specifically, clarity of the peak may be determined (for example, whether there is a tailing of the peak (a phenomenon where a reduction of a numerical value (intensity value) at a time later than the peak is slow and a base continues in a manner to tail after the peak (hereinafter, "peak tailing")), or whether or not it becomes impossible to detect a later peak due to the peak tailing appearing at a temporally earlier peak), or the peak intensity may be evaluated in comparison to an amount of electric power of another flashing current (evaluation of whether a current peak is higher or lower in comparison to a height of a peak obtained by an experiment or deduction for a certain amount of electric power of the flashing current). The evaluation of the temporal peak may be performed in real time during the analysis, and the electric power increasing pattern may be immediately selected with regard to the analysis. Alternatively, after the mass spectrometry of a series of specimens is completed, the temporal peak may be evaluated by a total ion current chromatogram or the like, and the electric power increasing pattern may be selected in the mass spectrometry of the next time or later. The electric power increasing pattern selected by the selector may be employed without an acceptance by the user or may be employed with the acceptance by the user. According to this configuration, efficient ionization or detection sensitivity improvement can be achieved based on the peak evaluation.

According to another embodiment of the present disclosure, the flashing processor may increase the amount of the electric power of the flashing current in the long term by performing one or both of extension of a flashing time (electricity application time) of the flashing current and an increase of a current value.

According to another embodiment of the present disclosure, there may be provided a gas chromatograph-mass spectroscopy apparatus comprising: the mass spectrometry apparatus described above; and a gas chromatograph that includes a column in which a temperature is controlled, and that sequentially injects the specimen separated by the column into the mass spectrometry apparatus, wherein the flashing processor increases the amount of the electric power of the flashing current in the long term according to a temperature control pattern of the column.

In this configuration, the specimen separated based on the temperature control pattern of the column is ionized by the emitter to which the flashing process is applied with a flashing temperature pattern correlated to the temperature control pattern. Because it is highly likely that a separation property at the column and a removal property at the emitter are associated with each other, it is effective to correlate the temperature control pattern of the column and the electric power increasing pattern of the flashing current.

An example of correlation between the temperature control pattern of the column and the electric power increasing pattern of the flashing current would be a relationship in which, when the temperature control pattern of the column is determined, the electric power increasing pattern of the flashing current is narrowed to one or a plurality of patterns. Alternatively, a correlation relationship may be employed in which the temperature control pattern of the column is narrowed when the electric power increasing pattern of the flashing current is selected. Alternatively, a configuration may be employed in which, when another element (such as a property deduced for the specimen) is selected, the temperature control pattern of the column and the electric power increasing pattern of the flashing current are narrowed to one or a plurality of patterns. Further, the temperature control pattern of the column and the electric power increasing pattern of the flashing current may be correlated to each other such that the patterns are those similar to each other. Here, "similar patterns" refer to patterns in which timings of a temperature change and an electric power change (for example, an increasing time when stepwise increasing the value, or an increasing time when continuously increasing the value) match each other, with a time lag suitably taken into consideration. However, in general, as the scales of the column temperature and the amount of electric power of the flashing current differ from each other, increasing widths or increasing ratios may differ from each other.

According to another embodiment of the present disclosure, there may be provided an emitter flashing current control apparatus which is a control apparatus of an emitter which applies an electric field to an injected specimen, to ionize the specimen, comprising a flashing processor.

(B) Details of Embodiment (1) Structure of Apparatus

FIG. 1 is a diagram schematically showing a structure of a gas chromatograph-mass spectrometry apparatus 10 according to an embodiment of the present disclosure. The gas chromatograph-mass spectrometry apparatus 10 comprises a GC (gas chromatograph) unit 20, an MS (mass spectrometry) unit 30, and a PC (personal computer) unit 40. The gas chromatograph-mass spectrometry apparatus 10 is a spectrometry apparatus in which a gas chromatograph formed by the GC unit 20 and the PC unit 40 and a mass spectrometry apparatus formed by the MS unit 30 and the PC unit 40 are combined and systemized.

The GC unit 20 is an apparatus which is used for identifying and quantifying a compound which is easily gasified. The GC unit 20 includes an oven 22, a column 24 placed in the oven 22, and a temperature controller 28. The oven 22 is a device having a function to heat an inside thereof. The column 24 is a structure in which a substance having an adhesion characteristic is filled in a tube as a fixed phase, and is placed in the oven 24. From one end of the column 24, a specimen is injected along with a carrier gas (inert gas). Components included in the specimen are retained by the column 24 for a retention time corresponding to the adhesion characteristic, and then exit from the other end of the column 24. Because the components have different adhesion characteristics, and consequently, different retention times, after the specimen passes through the column 24, the specimen is separated into the components. By the selection of the fixed phase, for example, it becomes possible to separate the components in the order of decreasing boiling point, or in the order of increasing polarity. The specimen which has passed through the column 24 is sent to an ion source 32 of the MS unit 30.

The temperature controller 28 is formed using hardware having a computation processing function. The temperature controller 28 receives a command from the PC unit 40, and controls the temperature of the oven 22. In general, when the temperature of the oven 22 is increased during the separation process of the specimen, the retention time is shortened. The heating control of the temperature controller 28 is applied to sufficiently separate the components in the specimen within a suitable time period.

The MS unit 30 is an apparatus which ionizes the specimen and applies the mass spectrometry. The MS unit 30 includes the ion source 32, a mass spectrometry unit 34, a signal processor 36, and a flashing current control unit 38.

The ion source 32 is an apparatus which ionizes the specimen by the FI method. The specimen is injected into the ion source 32 from the GC unit 20 or from another, separately provided apparatus which can introduce gas. The ion source 32 applies a strong electric field to the injected specimen, to ionize the specimen. Details of the ion source 32 will be described later.

The mass spectrometry unit 34 is an apparatus which measures a mass of the ionized specimen. The measurement of the mass is realized, for example, by a quadrupole mass spectrometry. The signal processor 36 is formed using hardware having a computation processing function, and performs an accumulation process of signals detected by the mass spectrometry unit 34 or the like. A processing result by the signal processor 36 is transmitted to the PC unit 40.

The flashing current controller 36 is formed using hardware having a computation processing function, and controls a flashing current to be applied to the emitter of the ion source 32 based on a command signal received from the PC unit 40. Specifically, the flashing current controller 36 controls a time interval for application of the flashing current, a current value (flashing current value), an electricity application time (flashing time) period, and the like. Because the temperature of the emitter changes depending on the Joule's heat by the flashing current, the flashing current controller 38 functions as a flashing processor which controls the flashing temperature.

The PC unit 40 is a device which uses a general-purpose personal computer, and controls and operates, with software (program), hardware having a computation processing function. As the software, in addition to basic software such as an operating system, dedicated software specialized for the gas chromatograph-mass spectrometry apparatus 10 is installed. The PC unit 40 includes a display 42, an inputter 44, a controller 46, an analysis processor 48, and a pattern setter 50. These elements are formed by controlling hardware of the PC unit 40 using dedicated software, and a configuration is employed such that various settings and analyses of the mass spectrometry result can be performed.

The display 42 is formed using a touch panel-type display, and displays a graphical user interface. Various setting screens, analysis result screens, and the like are displayed on the display 42. The inputter 44 is formed using a touch panel, a mouse, a keyboard, or the like, and performs an input through the graphical user interface. The user can set various settings and can command performance through the inputter 44 while viewing the display on the display 42. The controller 46 controls operations of various parts in the PC unit 40, and also performs control of the GC unit 20, data acquisition from the GC unit 20, control of the MS unit 30, and data acquisition from the MS unit 30. The analysis processor 48 performs analysis of data acquired from the signal processor 36 of the MS unit 30 or the like.

The pattern setter 50 sets an electricity application pattern for the flashing current of the emitter. Because the temperature of the emitter is controlled by the flashing current, the pattern setter 50 may be considered to be setting the pattern of the flashing temperature of the emitter. The pattern setter 50 is provided with a peak evaluator 52 and a pattern data storage 54.

The peak evaluator 52 is an example of a selector unit, and evaluates a state of a detection peak of each time acquired by the analysis processor 48. Specifically, the peak evaluator 42 applies evaluation such as whether or not a peak which should exist actually exists; whether or not, when there is a peak, the intensity thereof (number of detected ions) has a sufficient intensity in comparison to results of measurements at other flashing temperatures; and whether or not, when there is a peak, peak tailing has occurred which extends in the time direction. If the peak tailing has occurred, or when the peak cannot be detected because the peak is buried in the peak tailing, pattern data are selected in which the flashing temperature of the emitter is increased near this time. In addition, when the peak tailing does not has a sufficient intensity; that is, when it is judged that the detection sensitivity is inferior, pattern data are selected in which the flashing temperature of the emitter is reduced near this time.

The pattern data storage 54 stores a plurality of control patterns for the flashing current of the emitter (pattern data sets). The pattern setter 50 can display these pattern data sets on the display 42, to present the pattern data to the user. In this regard, the pattern setter 50 and the display 42 function as a presenter. In addition, the user can select one pattern data set from the plurality of presented pattern data sets through the inputter 44. The pattern setter 50 receives the pattern data set, and causes the flashing current controller 38 to apply control based on the pattern data set. In this regard, the inputter 44 and the pattern setter 50 function as a receiver.

Figure 2:
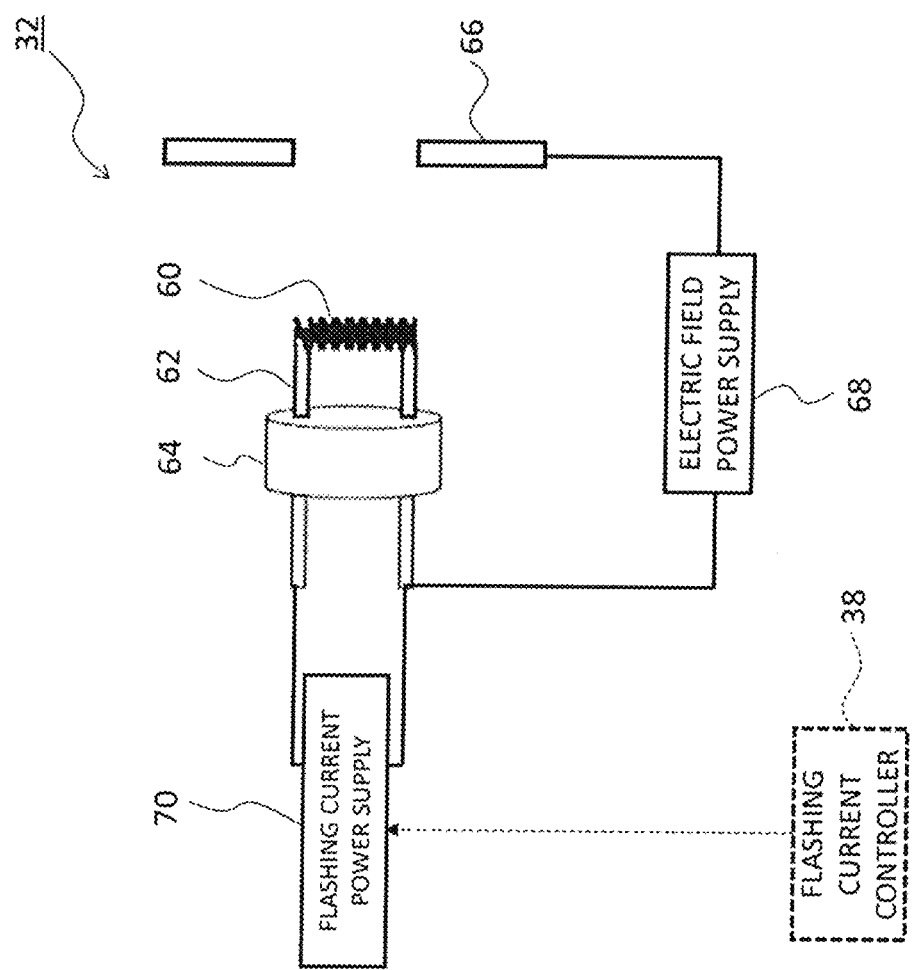
FIG. 2 is a diagram schematically showing a structure of an ion source.

Next, with reference to FIG. 2, the ion source 32 will be described. FIG. 2 is a schematic diagram of the ion source 32. The ion source 32 includes an emitter 60, pins 62, an insulator 64, a cathode 66, an electric field power supply 68, and a flashing current power supply 70.

The emitter 60 is an element in which a large number of protrusions (which are also called "whiskers") made of carbon crystal or the like are provided around a narrow metal piece (for example, having a diameter of about 10 μm) of tungsten or the like. On respective ends of the emitter 60, the metal pins 62 are connected, which are supported by the insulator 64. On a front side of the emitter 60, the cathode 66 formed from a plate-shaped metal is placed. Around a center of the cathode 66, a through hole for letting ions pass through is formed. The electric field power supply 68 is attached between the pin 62 and the cathode 66, and a voltage of about 8~10 kV is applied. With this structure, the emitter 60 functions as an anode which is set at a higher voltage in comparison to the cathode 66.

The flashing current power supply 70 is attached to the two pins 62. The flashing current power supply 70 is an example of the flashing processor, and applies the flashing current to the emitter 60 and heats the emitter 60 by the Joule's heat, under the control of the flashing current controller 38.

Figure 3:
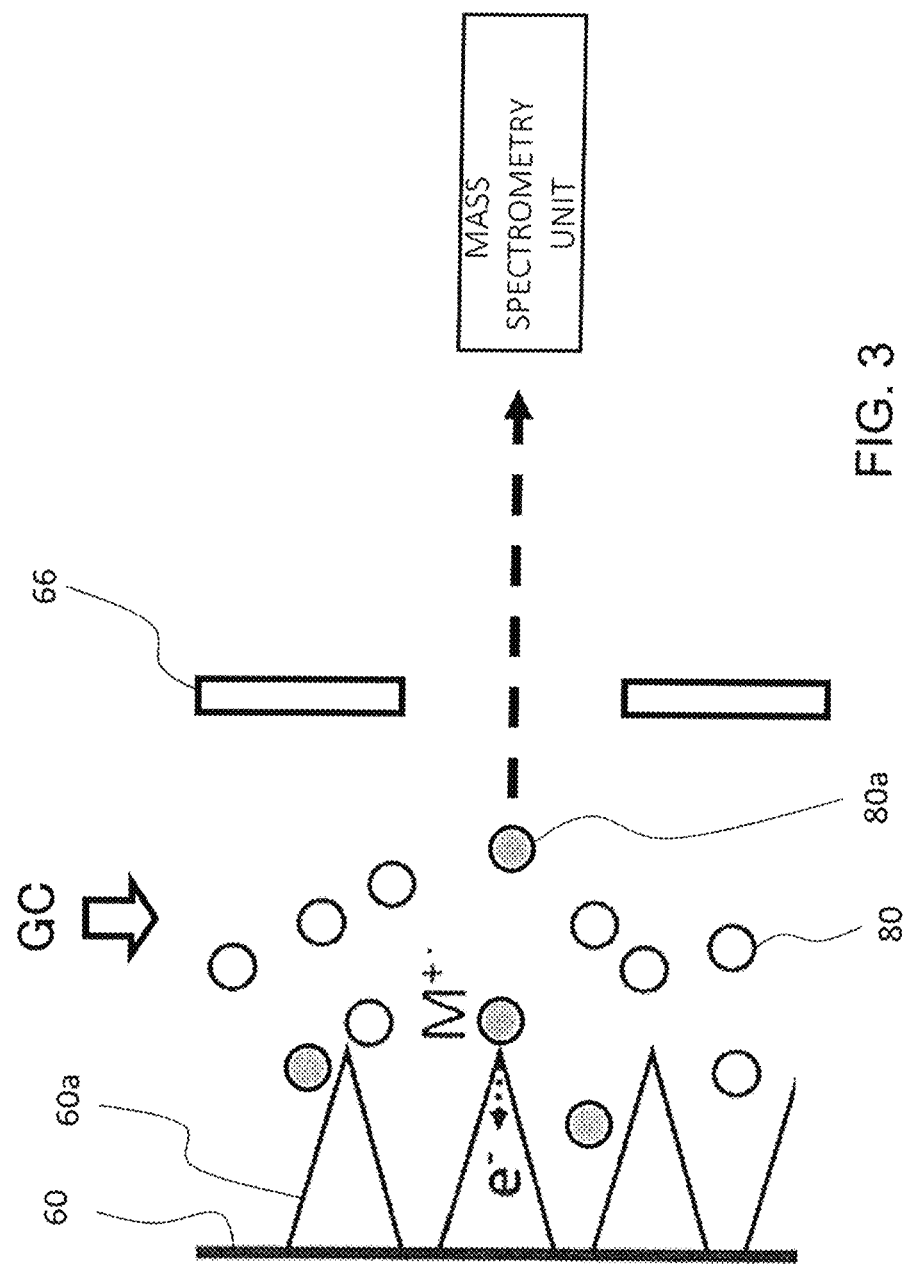
FIG. 3 is a diagram showing a process of ionization at an emitter.

FIG. 3 is a diagram showing ionization of the specimen by the emitter 60. FIG. 3 shows a case where a specimen 80 is injected from the GC unit 20 around a whisker 60a on the surface of the emitter 60. Here, a white circle shows the specimen 80 before ionization, and a shaded circle shows an ionized specimen ion 80a. In addition to the specimen 80, the carrier gas is also injected from the GC unit 20, but because the carrier gas using the inert gas is not ionized, the carrier gas is not shown.

As described above, a high voltage is applied between the cathode 66 and the emitter 60, and a strong electric field is caused between the cathode 66 and the emitter 60. In particular, the electric field is concentrated near a tip of the whisker 60a which has a sharp shape. When the injected specimen 80 reaches a region near the tip of the whisker 60a, electrons of the specimen 80 passes through the whisker 60a by the tunneling effect. With this process, the specimen 80 becomes the specimen ion 80a. The specimen ion 80a is attracted to the cathode 66, passes through the through hole on the cathode 66, and moves toward the mass spectrometry unit 34.

However, a part of the specimen 80 is adhered on the surface of the emitter 60 including the whisker 60a. In consideration of this, in the emitter 60, a current is applied from the flashing current power supply 70 at a suitable time interval, to heat the emitter 60 by the Joule's heat. The adhered specimen 80 is removed from the surface of the emitter 60 by gaining energy of thermal motion. In particular, at a temperature exceeding the boiling point of the specimen 80, the gasified specimen 80 is easily removed from the surface of the emitter 60. However, when the emitter 60 is heated, the ionization efficiency of the specimen 80 is reduced, and, in this case, there is a general tendency of reduction in the number of specimen ions 80a detected by the mass spectrometry unit 34.

(2) Operation when Flashing Current is Constant

Figure 4:
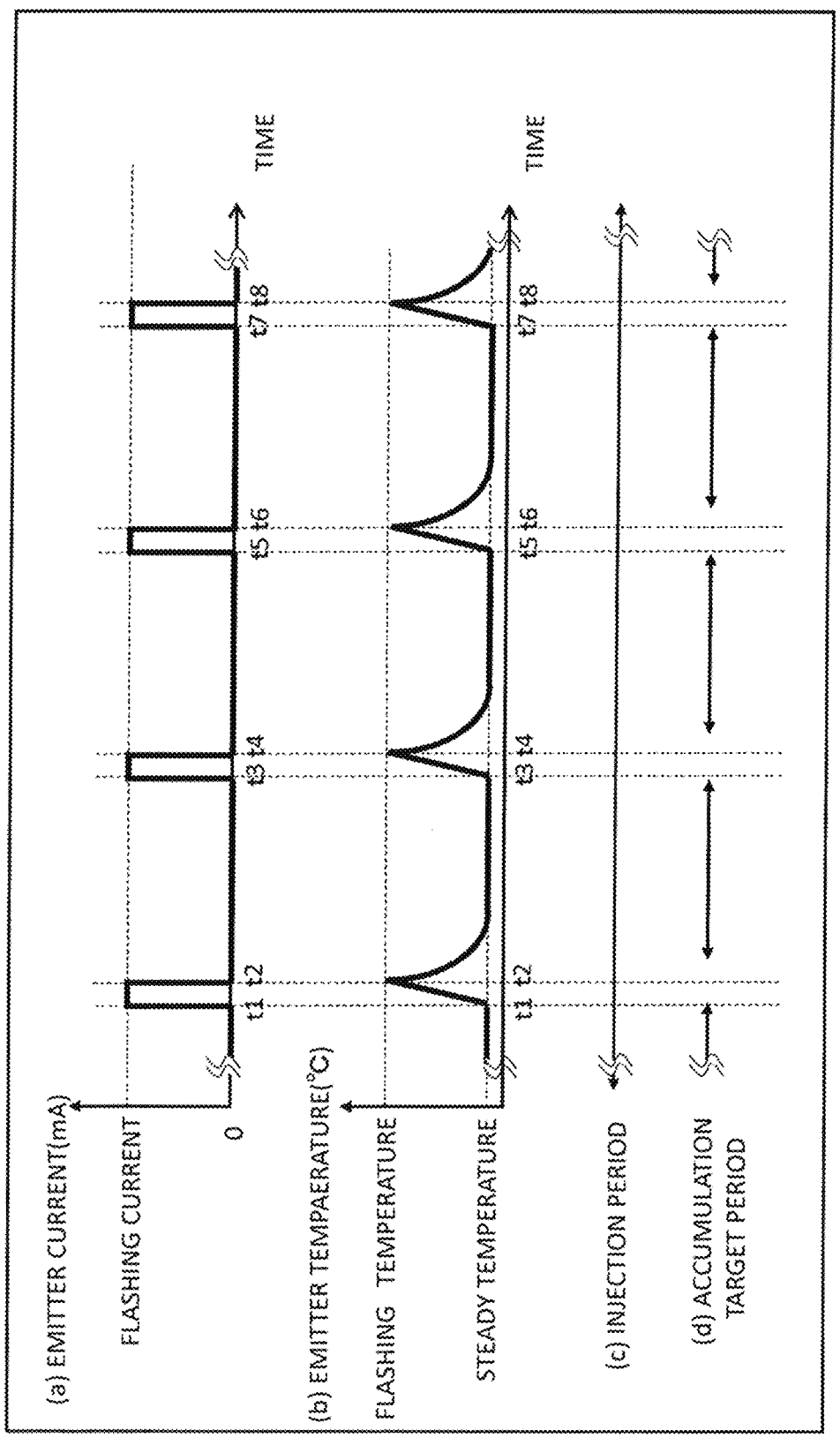
FIG. 4 is a schematic time chart showing a relationship among a flashing current, a flashing temperature, and the like during a mass spectrometry process.
Figure 5:
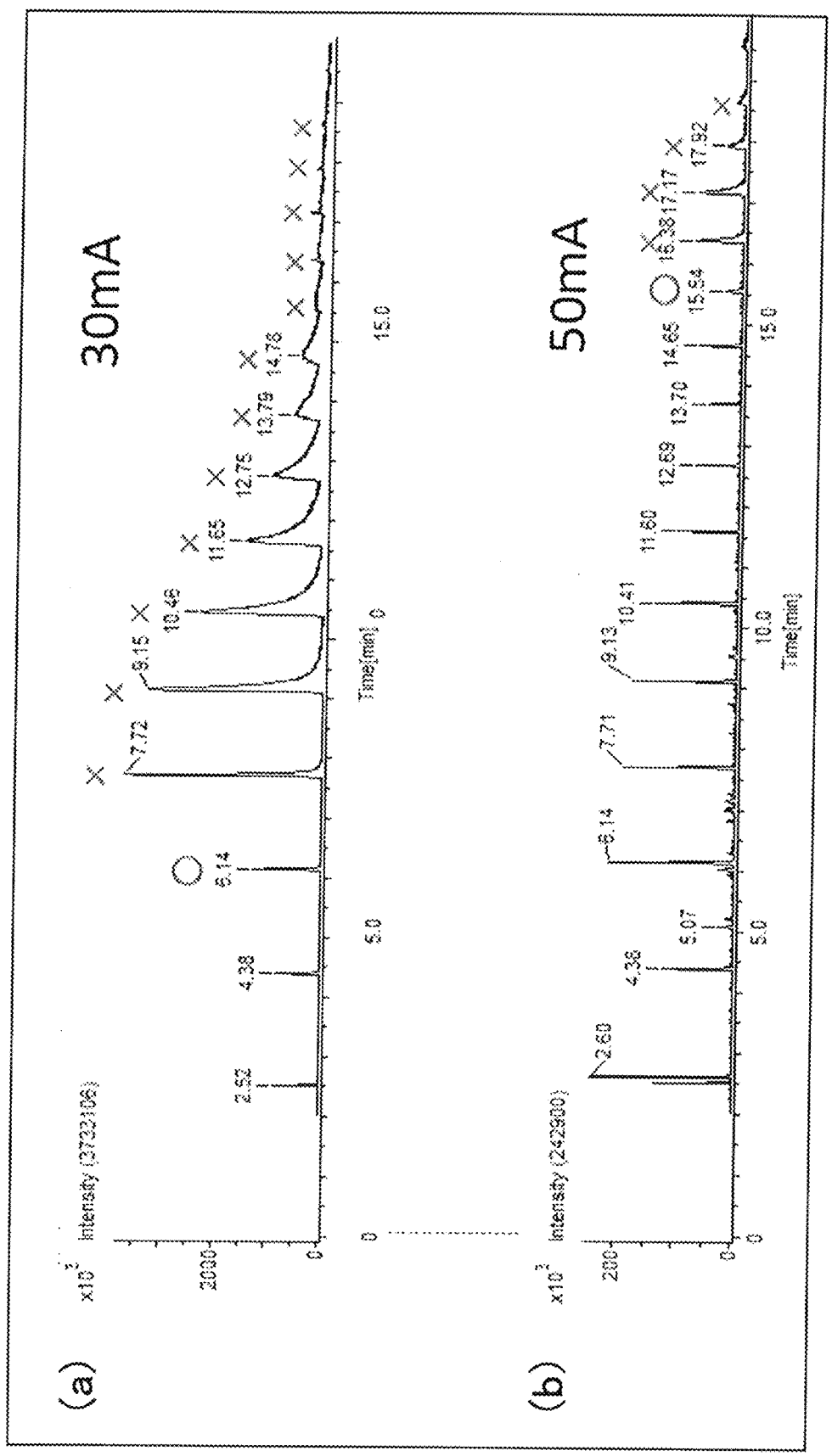
FIG. 5 is a diagram showing a difference in TICC due to a difference in a flashing current.

With reference to FIGS. 4 and 5, an operation of the gas chromatograph-mass spectrometry apparatus 10 when an amount of electric power of the flashing current is set constant will be described.

FIG. 4 is a time chart showing an operation timing in the gas chromatograph-mass spectrometry apparatus 10. A horizontal axis of FIG. 4 is a common time axis, and FIG. 4 shows, on this time axis, (a) an emitter current, (b) an emitter temperature, (c) an injection period, and (d) an accumulation target period.

In the period drawn in the figure, as shown by an arrow in (c) the injection period, the specimen is continuously injected from the GC unit 20 to the ion source 32. That is, a component having a retention time corresponding to the time is injected into the ion source 32. At the ion source 32, a high voltage is steadily applied between the emitter 60 and the cathode 66. Because of this, the injected specimen is continuously ionized by the emitter 60, and is sent to the mass spectrometry unit 34.

As shown by (a) the emitter current, at the emitter 60, the flashing current is applied in a pulse shape with a set short-time interval (for example, about 500 milliseconds). In the illustrated example configuration, the flashing current of a constant value (for example, 40 mA) is applied during a very short time period (for example, 30 milliseconds) from a time t1 to a time t2. The value of the flashing current is set by the pattern setter 50 and is controlled by the flashing current controller 38. The current is stopped from the time t2 to a time t3 (for example, 470 milliseconds, although the interval is not accurately shown). After the time t3, the processes from the time t1 are repeated. Thus, the flashing current is applied between the time t3 and a time t4, and the flashing current is stopped from the time t4 to a time t5.

When the flashing current is applied, as shown in (b) the emitter temperature, Joule's heat is generated in the emitter 60, and the temperature of the emitter 60 is increased. In the illustrated example configuration, the emitter 60 is at a steady temperature until the time t1, but because the emitter 60 is heated from the time t1 to the time t2 by the Joule's heat, the temperature is increased in proportion to the time (if a cooling action is approximately ignored), and the temperature reaches the "flashing temperature", which is the highest temperature, at the time t2. After the time t2, because the heating is stopped, the temperature of the emitter 60 is gradually reduced by effects of heat radiation and heat absorption by carrier gas in contact with the emitter 60, and is returned to the steady temperature.

A part of the injected specimen is adhered onto the emitter 60, but with the heating of the emitter 60 to the flashing temperature, specimen components, in particular the specimen components having boiling points lower than or equal to the flashing temperature, are quickly removed from the emitter 60. However, components having higher boiling points than the flashing temperature may continue to adhere onto the emitter 60. In addition, a part of the specimen may be thermally decomposed by the flashing temperature.

As shown in (d) in FIG. 4, in the mass spectrometry unit 34, the accumulation of the detected ions is not performed in a period from the time t1 to a time slightly later than the time t2, in which the flashing current is applied to the emitter 60. The accumulation of the detected ions is performed from the time slightly later than the time t2 to the time t3. This is because of a reason of excluding, from the accumulation target, ions thermally decomposed by the flashing temperature, for example. The accumulation target time can be suitably changed. For example, as will be described later, when the flashing temperature is set high during a series of measurement periods, cooling would also require a long time. Thus, during this measurement period, a long time may be secured as the time from stopping of the electricity application to the restart of the accumulation.

FIG. 5 is a diagram showing a mass spectrometry result when the flashing current is set constant in a series of measurements. (a) and (b) in FIG. 5 show a total ion current chromatogram (TICC) acquired as a result of separation of the same specimen by the GC unit 20, injection of the specimen into the MS unit 30, and the mass spectrometry of the specimen. The TICC is an observation of the specimen components separated in time by the gas chromatograph as a total ion current amount by mass spectrometer. A horizontal axis shows a time until the specimen component is discharged from the gas chromatograph, and a vertical axis shows an ion intensity derived from the specimen component. In either case of (a) or (b) of FIG. 5, the value of the flashing current is set constant during the detection period. The TICC of (a) of FIG. 5 shows a result when the flashing current of 30 mA is applied for 30 milliseconds every 0.3 seconds, and the TICC of (b) of FIG. 5 shows a result when the flashing current of 50 mA is applied for 30 milliseconds every 0.3 seconds.

As shown in (a) of FIG. 5, in this specimen, a first peak appears around a time after 2.52 minutes, and then peaks are detected in the order of a time after 4.38 minutes, a time after 6.14 minutes, and a time after 7.72 minutes. Here, for the peak of the time after 6.14 minutes and the peaks before this peak (peaks of the time after 2.52 minutes and the time after 4.38 minutes) shown with a circle over the numerical value, sharp peaks are observed. However, for the peak of the time after 7.72 minutes and later peaks shown with an x over the numerical value, peak tailing is observed in which the base is widened to a time period after the peak. The peak tailing becomes larger for the later detection times, and the peak of the time after 14.78 minutes has a shape which is rounded to a certain degree. In times after this time, the peaks are buried in the background, and cannot be detected. In general, when peak tailing occurs, and when the peak cannot be detected, there is a problem such as inability to compare the data of the TICC with the chromatogram detected by a detector of the GC unit 20.

Peak tailing is caused because the specimen or impurity adhered on the emitter 60 is not sufficiently removed even after the flashing current is applied. In particular, a component having a long retention time and a high boiling point has a higher boiling point than the flashing temperature realized by the flashing current value of 30 mA, and, even after the flashing, the component continues to adhere on the emitter 60, and causes the peak tailing.

On the other hand, in the example configuration shown in (b) of FIG. 5, peak tailing does not occur for the peak of the time after 7.71 minutes (this is the same component as the peak of the time after 7.72 minutes in (a) of FIG. 5), and, in addition, peak tailing does not occur until the peak of the time after 15.54 minutes. However, for the peak of the time after 16.38 minutes and later peaks, peak tailing occurs.

The flashing current of 50 mA applied in the example configuration of (b) of FIG. 5 is 5/3 times the flashing current of 30 mA applied in the example configuration of (a) of FIG. 5. Therefore, the Joule's heat generated at the emitter 60 of the example configuration of (b) of FIG. 5 is 25/9 times that of (a), which is proportional to a square of the current. If the cooling action during the flashing period is ignored, the temperature increase due to the flashing process can be estimated as about 25/9 times that of (a) (in reality, due to the cooling effect, the temperature increasing ratio is not as high as this number). Because of this, the components having higher boiling points can be removed from the emitter 60, and peak tailing is significantly reduced. However, the component of the peak of the time after 16.38 minutes and the components of the later peaks may be considered to have a further higher boiling point, and, in order to eliminate these peak tailings, application of a larger flashing current is necessary.

It should be noted that, when a larger flashing current is applied, the number of ions which can be detected by the MS unit 30 is reduced. As is clear from the vertical axes on (a) and (b) of FIG. 5, the number of ions is reduced to about 1/10 in the case of (b) of FIG. 5 in comparison to the case of (a) of FIG. 5. Therefore, it is not desirable, for example, to set a larger flashing current value (for example, 60 mA) in all periods, in order to eliminate the peak tailing for the peak of the time after 16.38 minutes in (b) of FIG. 5.

In consideration of this, a configuration may be considered in which, for example, in the example configurations of FIG. 5, the flashing current is set to 30 mA until the time near the time after 6.14 minutes, to 50 mA until the time near the time after 15.54 minutes, and to a higher current at later times. With this configuration, it is possible to prevent or suppress occurrence of peak tailing and to improve the analysis sensitivity (increase intensity value) over all periods of the measurement. In order to realize such a process, in the present embodiment, as will be described next, the flashing current value can be set to gradually increase. With this configuration, for example, it becomes possible to apply flashing at a low temperature with a small flashing current value for components having low boiling points, and to apply flashing at a high temperature with a large flashing current value for components having high boiling points.

Figure 6A:
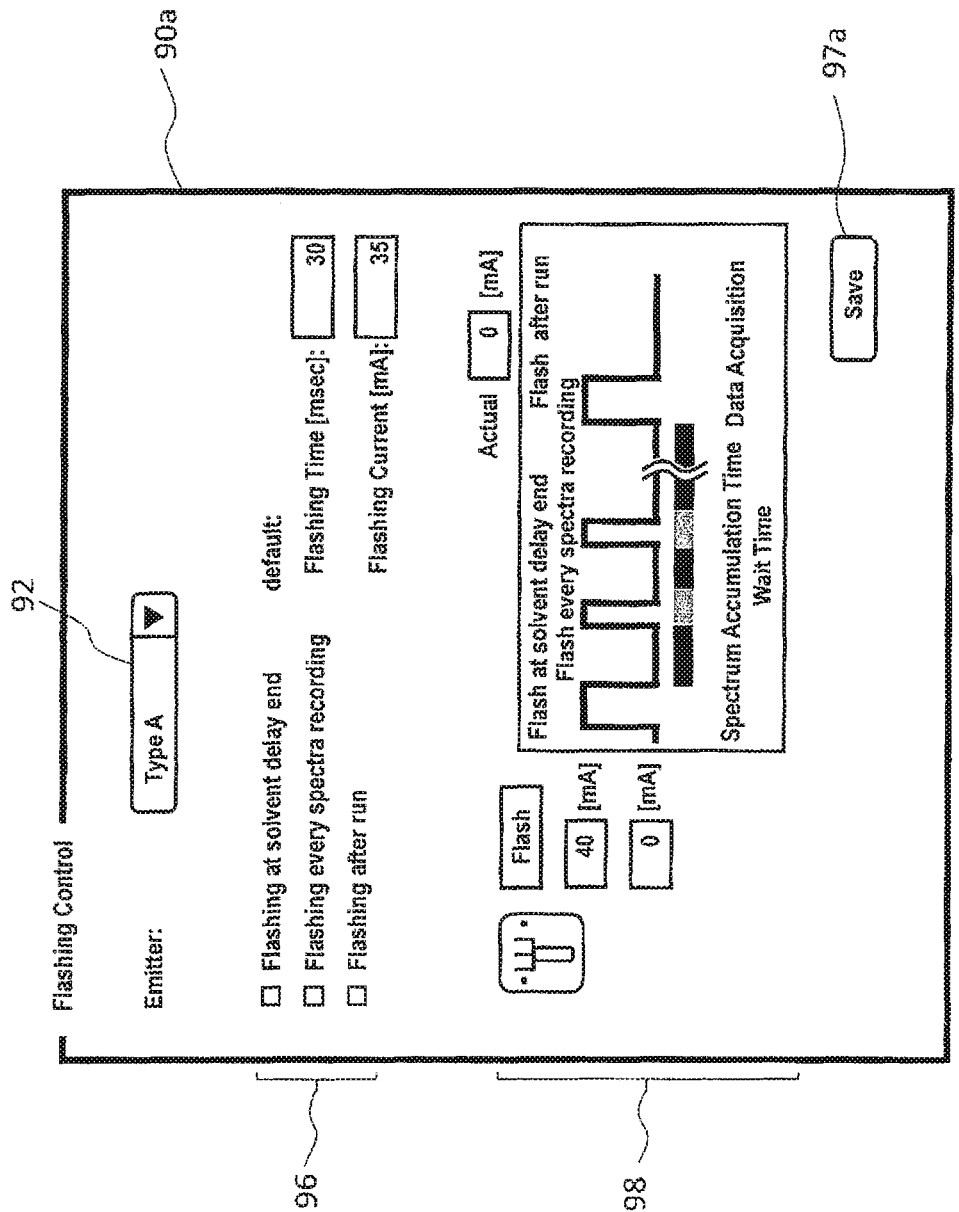
FIG. 6A is a diagram showing an example setting screen of a flashing current.
Figure 6B:
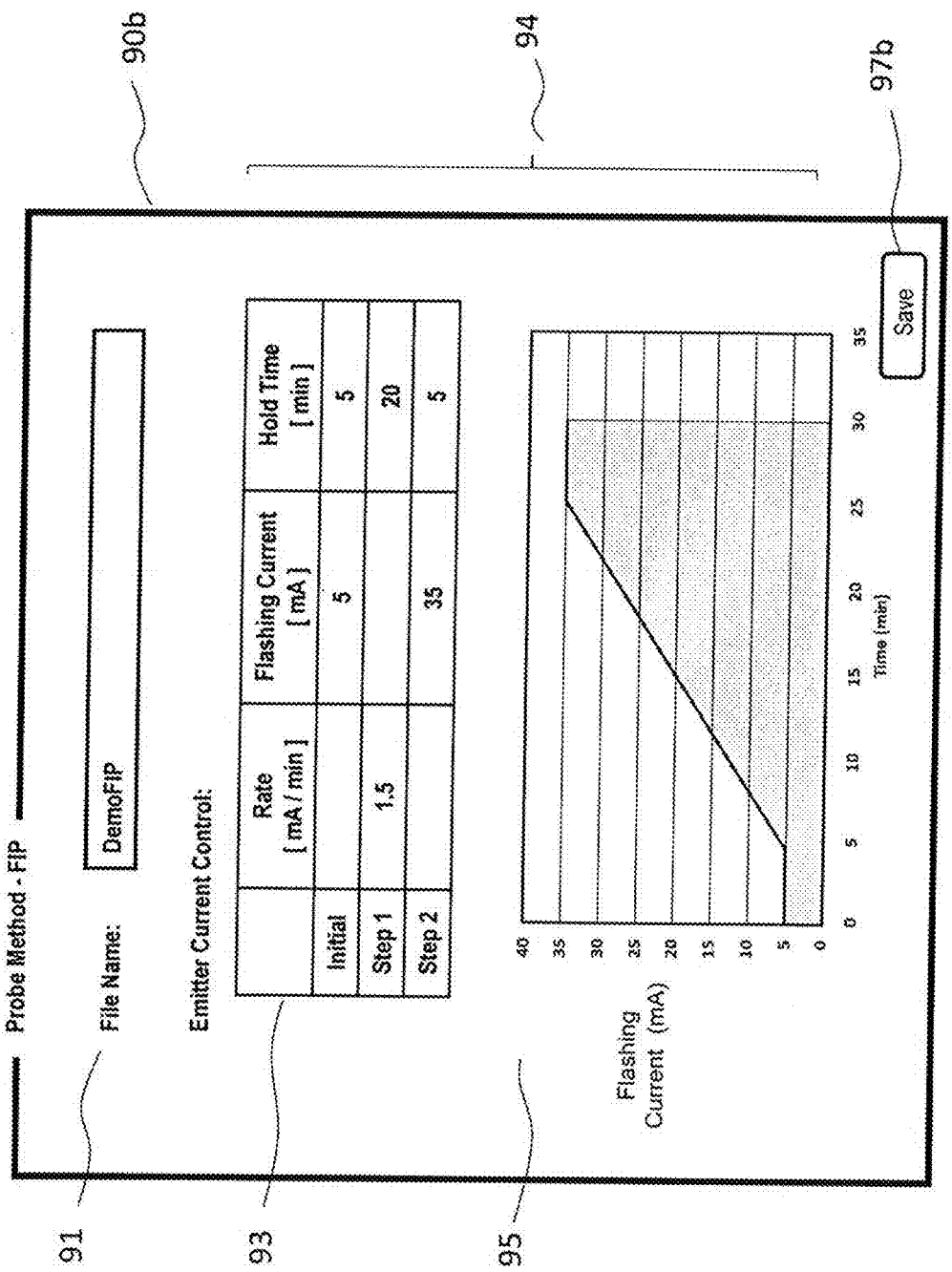
FIG. 6B is a diagram showing an example setting screen of a flashing current.

(3) Setting of Flashing Current (3-1) Change of Current Value of Flashing Current First, with reference to FIGS. 6A and 6B, setting of the flashing current will be described. FIGS. 6A and 6B show example setting screens of the MS unit 30, displayed on the display 42 of the PC unit 40. A setting screen 90a of FIG. 6A is for setting ionization by the FI method. A model number of the emitter 60 or the like is input in an item 92. Here, a "Type A" is input. Because the emitter 60 has different electrical resistance values and heat capacities depending on the product, the value of the applied flashing current when a certain voltage is applied or the temperature of the emitter 60 may vary, and thus, it is necessary to accurately input the manufacturer name, the model number, and the like.

An item 96 is for setting details of the flashing current. Because the specimen is not discharged from the GC unit 20 for a certain period of time after the start of the measurement at the gas chromatograph-mass spectrometry apparatus 10, with the setting of "Flashing at solvent delay end", a wait time is set. After the wait time has elapsed, the emitter 60 is once cleaned by a very high flashing temperature, and the measurement is then started. The setting of "Flashing every spectra recording" means that the flashing current is intermittently applied during the measurement period. The setting of the specific time interval for application of the flashing current is done by a screen different from the illustrated screen. The settings of "Flashing Time [msec] 30" and "Flashing Current [mA] 35" below "default" indicate that default values (initial values) of the flashing current value and the flashing time are set at 35 mA and 30 milliseconds, respectively. The setting of "Flashing after run" means that flashing is performed after a series of specimen is injected, and is used in cases where measurement of a plurality of times is performed without human attendance.

In an item 98, a setting such as the value of the flashing current is received, and a setting result is displayed. In the illustrated example configuration, settings are input such as that the flashing current for "Flash at solvent delay end" and "Flash after run" is to be set to "40 mA", and that, normally, a current of "0 mA" is to be applied to the emitter 60 (that is, no current is to be applied). The setting of "Wait time" shows how much time is to elapse from the end of the application of the flashing current until the restart of the accumulation, and displays the setting result in a graph. In addition, the time interval (interval) of application of the flashing current is defined including a period which is set for detecting the signal of the mass spectrometry (corresponds to (d) the accumulation target period of FIG. 4), and is set on another screen (not shown). These settings are stored in the pattern data storage 54 of FIG. 1 by the user pressing a Save button 97a, and a command is sent from the PC unit 40 to the flashing current controller 38 at the start of the analysis.

An item 93 in an item 94 of FIG. 6B is a numerical value setting table of the flashing current to be applied to the emitter 60. Here, a setting is shown in which the flashing current value (Flashing Current [mA]) is first held at 5 mA, which is a relatively small value, for 5 minutes (illustrated as "Hold Time [min]"), is then gradually increased for 20 minutes at a current increasing rate of 1.5 mA/minute (illustrated as "Rate [mA/min]") (step 1), and is held for 5 minutes at a value of 35 mA which is a value reached as a result of the increase (step 2). A graph 95 matching the numerical value setting table of the item 93 is displayed. A numerical value setting table similar to the item 93 of FIG. 6B is also displayed and referred to in FIGS. 7 to 14, as will be described later.

The user can input a file name (in the shown example, "DemoFIP") in a field of an item 91 (File Name), to store the setting contents in the file. Specifically, when a Save button 97b of FIG. 6B is clicked by a mouse or the like (not shown), the setting content is stored in a text format, for example. When measurement referring to this file is instructed by another screen (not shown), the PC unit 40 sends commands to the flashing current controller 38 to perform the flashing process of the emitter 60 according to the setting content of the file. Here, an example configuration is described in which a value is input to the item 93 to create the file, but alternatively, for example, a file created by another computer or the like may be stored in advance in the pattern data storage 54 of FIG. 1, and may be called by inputting the file name of the file in the item 91. The called result may be displayed on the screen as in the item 93 of FIG. 6B, or the content thereof may be allowed to be corrected.

Next, with reference to FIGS. 7 to 13, examples of the flashing current values which are set by the item 94 of FIG. 6B will be described.

Figure 7:
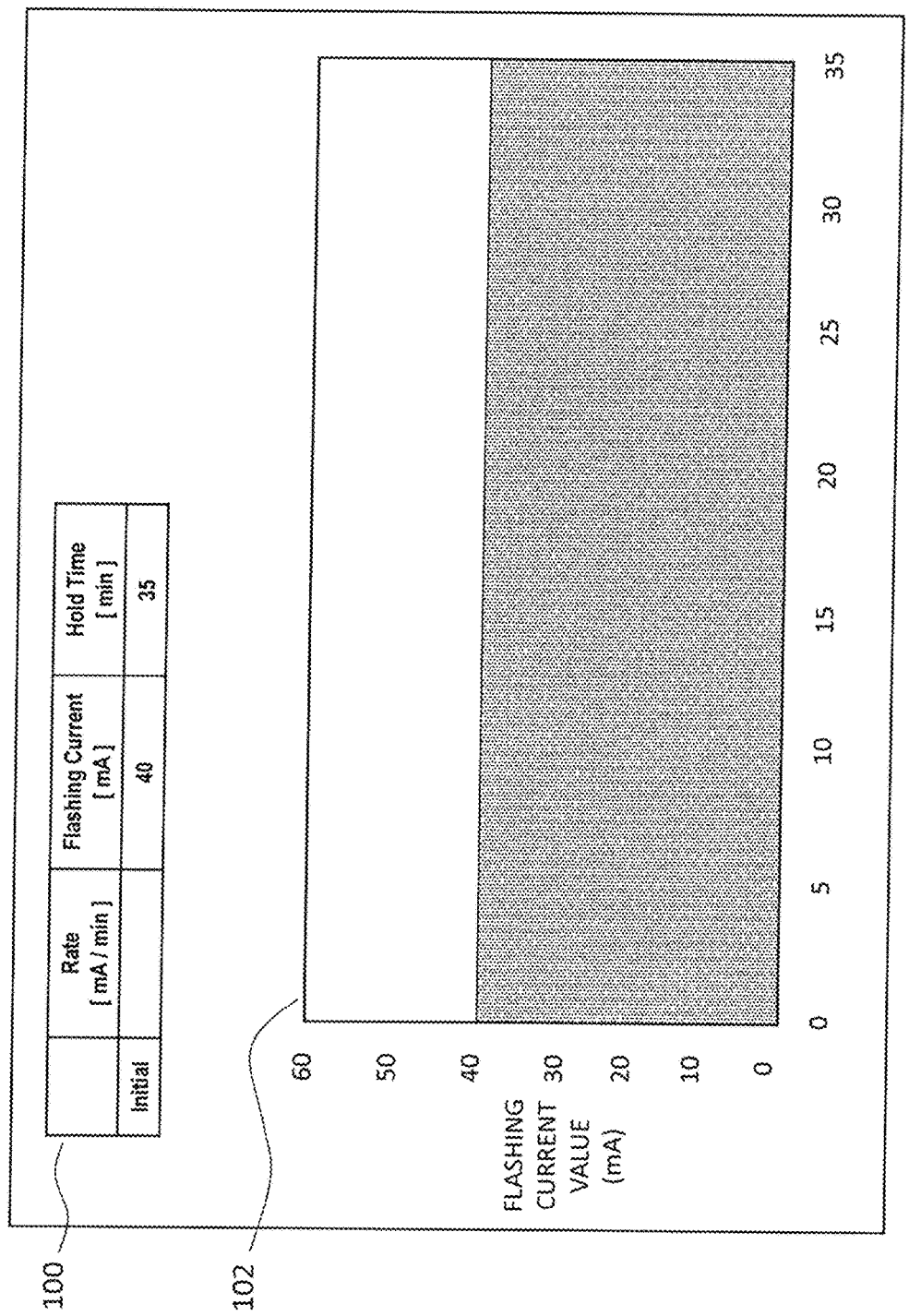
FIG. 7 is a diagram showing an example setting when a flashing current value is maintained constant.

FIG. 7 shows an example setting when the flashing current value is held constant. Here, a case is considered in which the user selects data shown on a graph 102 of FIG. 7 from a plurality of pattern data sets of flashing current value. The pattern setter 50 receiving the selection displays a numerical value setting table 100, and requests the user to input a specific current value. In the illustrated example, the flashing current value (Flashing Current) is set at 40 mA. For example, when the boiling points of the components included in the specimen do not significantly differ from each other, the measurement may be performed using this pattern data. As described before, the flashing time in which the flashing current is to be applied and a time interval between applications of the flashing current are separately set.

The graph 102 shown in FIG. 7 displays the flashing current value reflecting the value which is input to the numerical value setting table 100. Here, the flashing current of 40 mA is applied for the measurement time of 35 minutes with the set flashing time and set flashing time interval.

Figure 8:
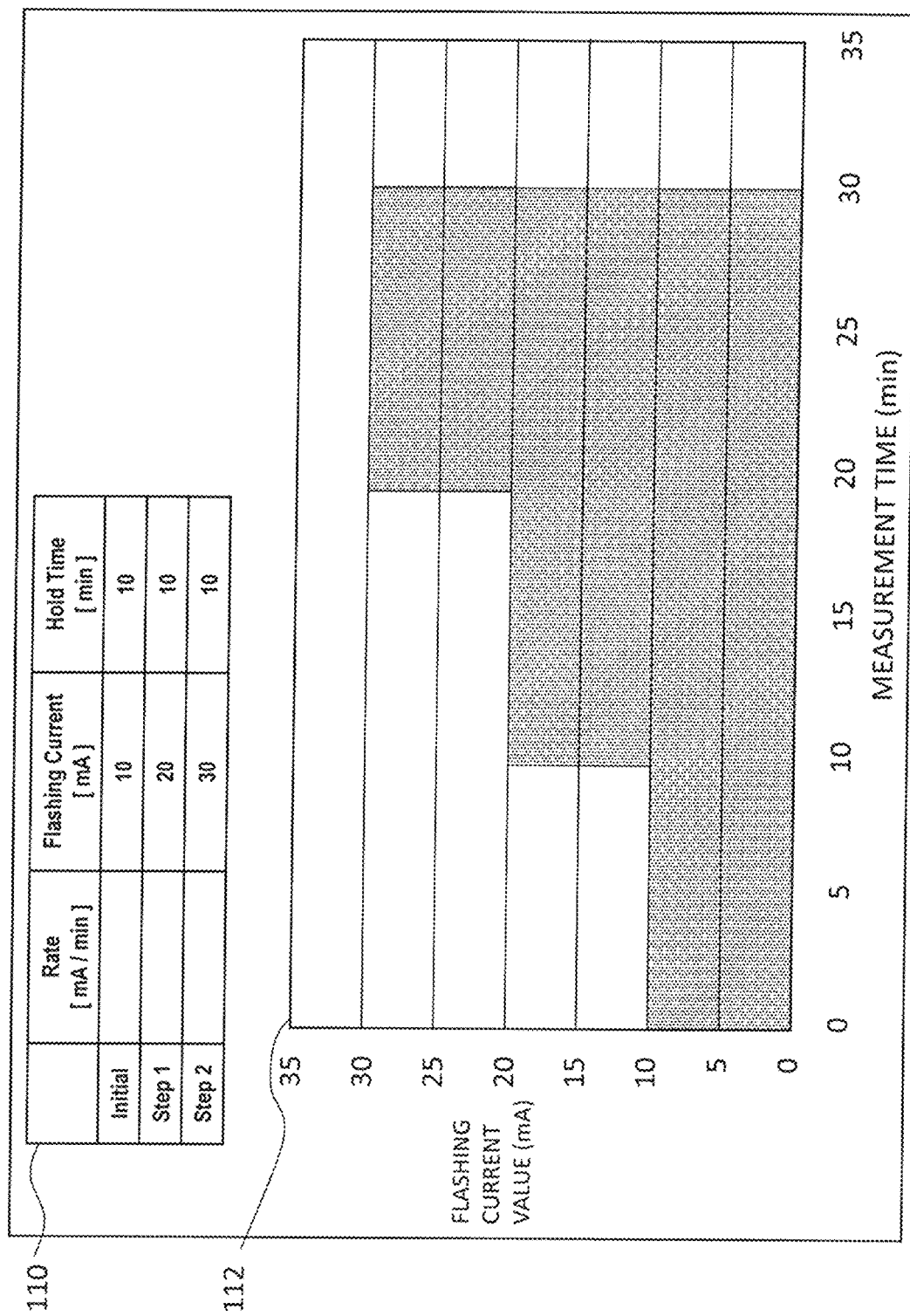
FIG. 8 is a diagram showing an example setting when a flashing current value is stepwise increased.

FIG. 8 shows an example setting in which the flashing current is stepwise increased. When the user selects this pattern data, a numerical value setting table 110 shown in the figure is displayed, and the user is requested to input a numerical value. Here, an input is made to set the flashing current value (Flashing Current) to 10 mA from 0 minute to 10 minutes, to set the flashing current value (Flashing Current) to 20 mA from 10 minutes to 20 minutes, and to set the flashing current value (Flashing Current) to 30 mA from 20 minutes to 30 minutes. In a graph 112, there is also drawn a change, with respect to time, of the flashing current value, following to this setting. In this example setting, the flashing current value is increased from the initial value in 2 stages, but alternatively, an increase with 1 stage or an increase with 3 or more stages may be set by changing the input to the numerical value setting table 110.

Using this setting pattern, even for the example experiment shown in FIG. 5, a setting of the flashing current is possible, which improves optimality. For example, the "Flashing Current" may be set to 30 mA and the "Hold Time" may be set from 6 to 7 minutes from the start to 6~7 minutes after, the "Flashing Current" may be set to 50 mA and the "Hold Time" may be set from 8 to 10 minutes until 15~16 minutes after, and the "Flashing Current" may be set to 70 mA and the "Hold Time" may be set to 10 minutes thereafter. With this setting, a clear and large peak may be expected over all periods.

Figure 9:
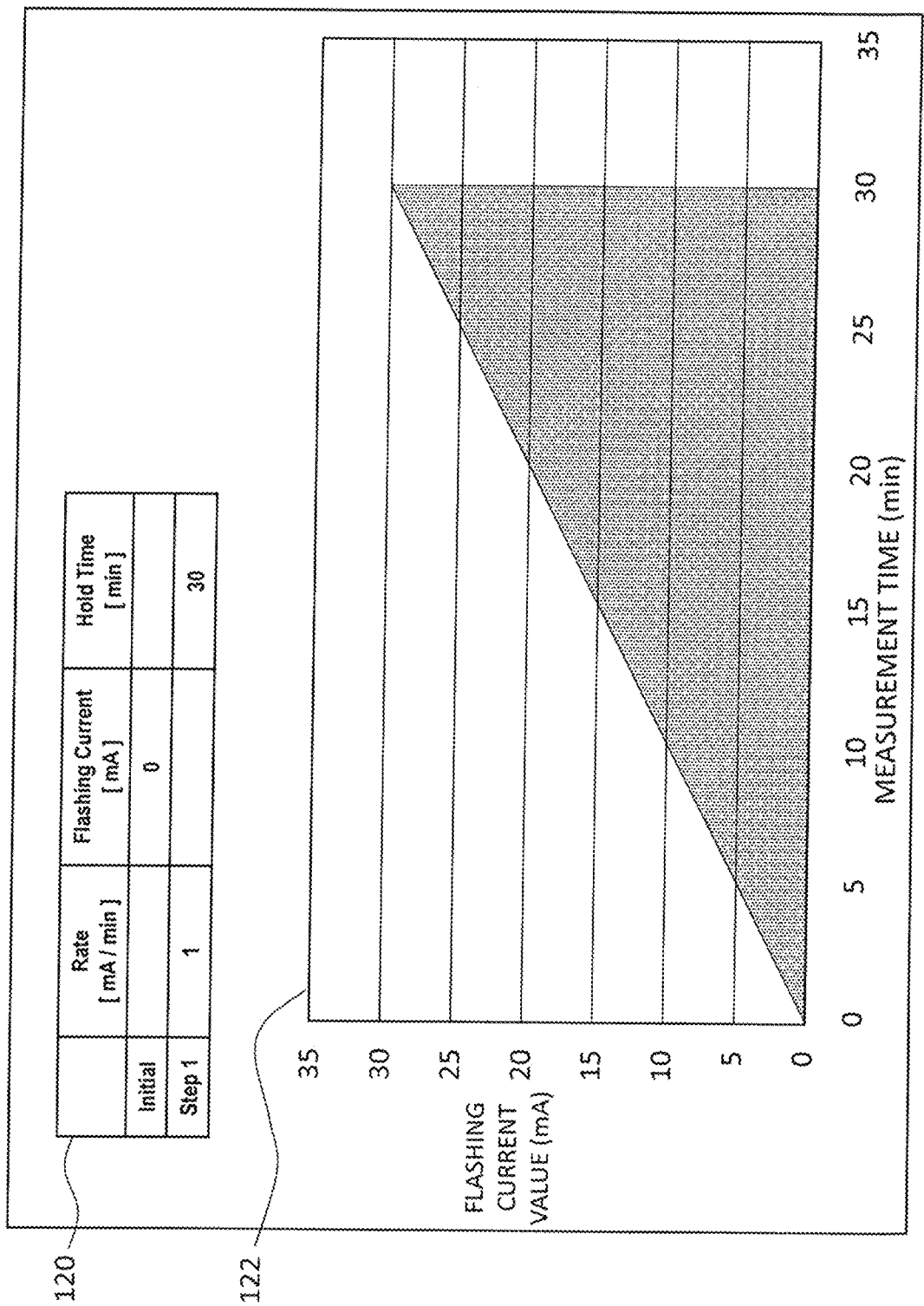
FIG. 9 is a diagram showing an example setting when a flashing current value is continuously increased.

FIG. 9 shows a setting example in which the flashing current value is continuously increased. When the user selects this pattern data, a numerical value setting table 120 is displayed. In the numerical value setting table 120, a setting is made in which a current increase (Rate) of the flashing current value is set at a ratio of 1 mA/min., and the flashing current is set at 0 mA at the start and 30 mA at the end. As a result, as drawn in a graph 122, the flashing current increases with a constant ratio over time, so that the flashing current is 0 mA at the initial stage, and is 30 mA 30 minutes later. Because the flashing of the emitter is repeated with a flashing of a certain time interval as 1 cycle as shown in FIG. 4, flashing of the emitter is performed n times (n cycles) per minute. In other words, the setting of the current increase of 1 mA/min. means that the current is to be increased at a rate of 1 mA per n cycles. In this case, control is applied to approximate, with a function which changes in a step shape, an increase of the flashing current value of 1 mA with elapse of 1 minute (n cycles). Therefore, an alternative configuration may be considered in which, with a description of "2/2" in the Rate field in place of "1", the flashing current controller 38 of FIG. 1 controls the emitter of the ion source 32 so that the flashing current does not change for 2 minutes, and the flashing current is increased by 2 mA every time 2 minutes elapse.

Similarly, in the examples of FIG. 10 and later also, the time of the current increase rate is converted to the number of cycles, and the flashing current is changed every time a predetermined number of cycles are performed. In this manner, in the actual control of the flashing current power supply 70 of the flashing current controller 38, control may be applied in which the current increase rate per unit time is approximated as an increase of the flashing current per a predetermined number of cycles. As an alternative configuration, control may be applied in which the flashing current value is minutely increased every cycle. In the example of FIG. 9, the increase of 1 mA/min. is achieved by increasing the flashing current of the emitter by "1/n" mA per cycle. Alternatively, the setting of the continuous increase value of the flashing current value may be non-linear with respect to time (for example, a pattern smoothly connecting an original value and a later value by a sine curve).

Figure 10:
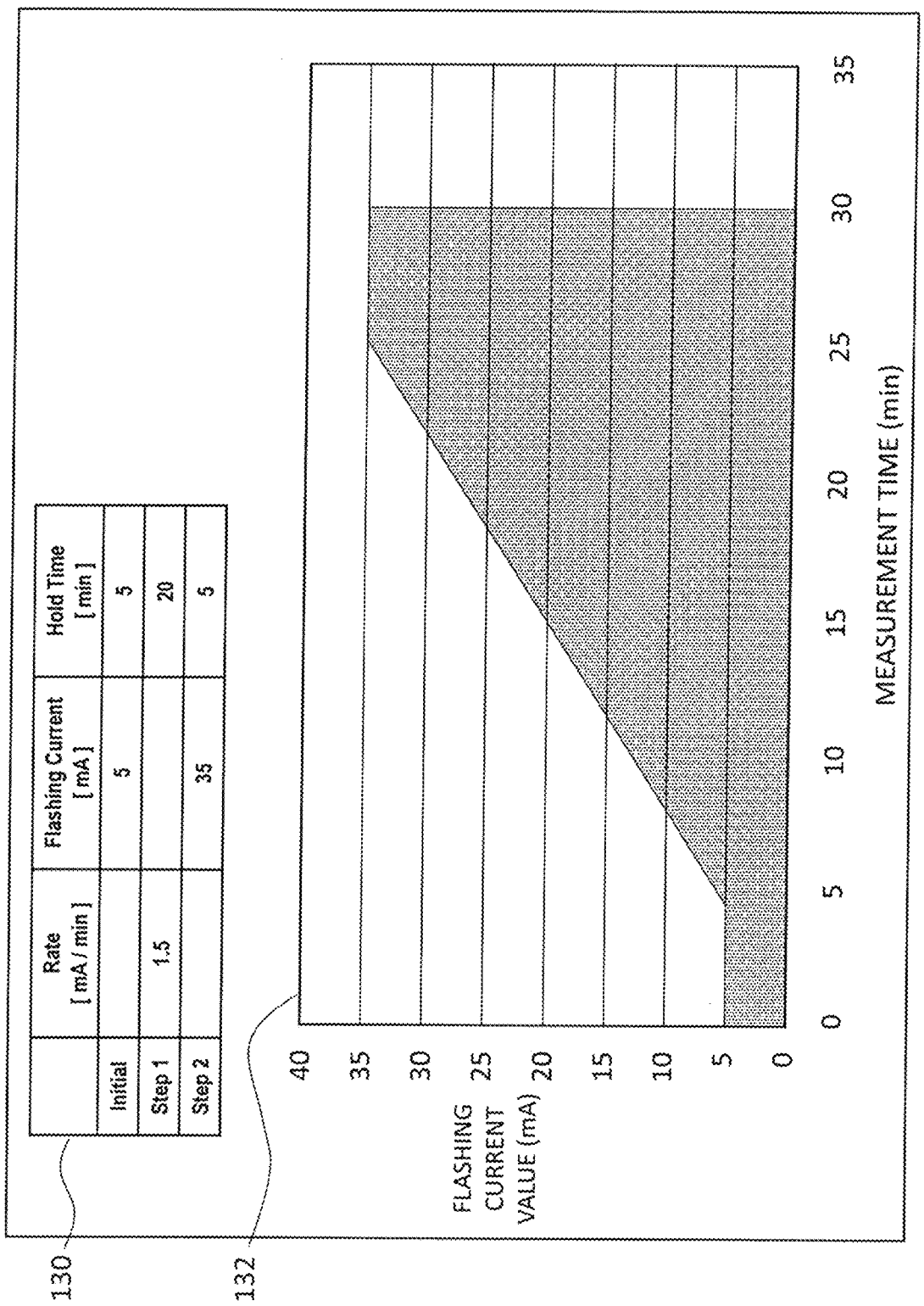
FIG. 10 is a diagram showing another example setting when a flashing current value is continuously increased.

FIG. 10 shows an example setting in which the flashing current is started with a constant value, is increased with a constant ratio in an intermediate period, and is finally held at a constant value. When this pattern is selected, a numerical value is to be input to a numerical value setting table 130. In the illustrated example, a setting is made in which the current increase (Rate) of the flashing current is 1.5 mA/min., the current is 5 mA for 5 minutes from the start, and the current is 35 mA for 5 minutes at the end. A graph 132 shows the flashing current value (Flashing Current) according to this setting.

Figure 11:
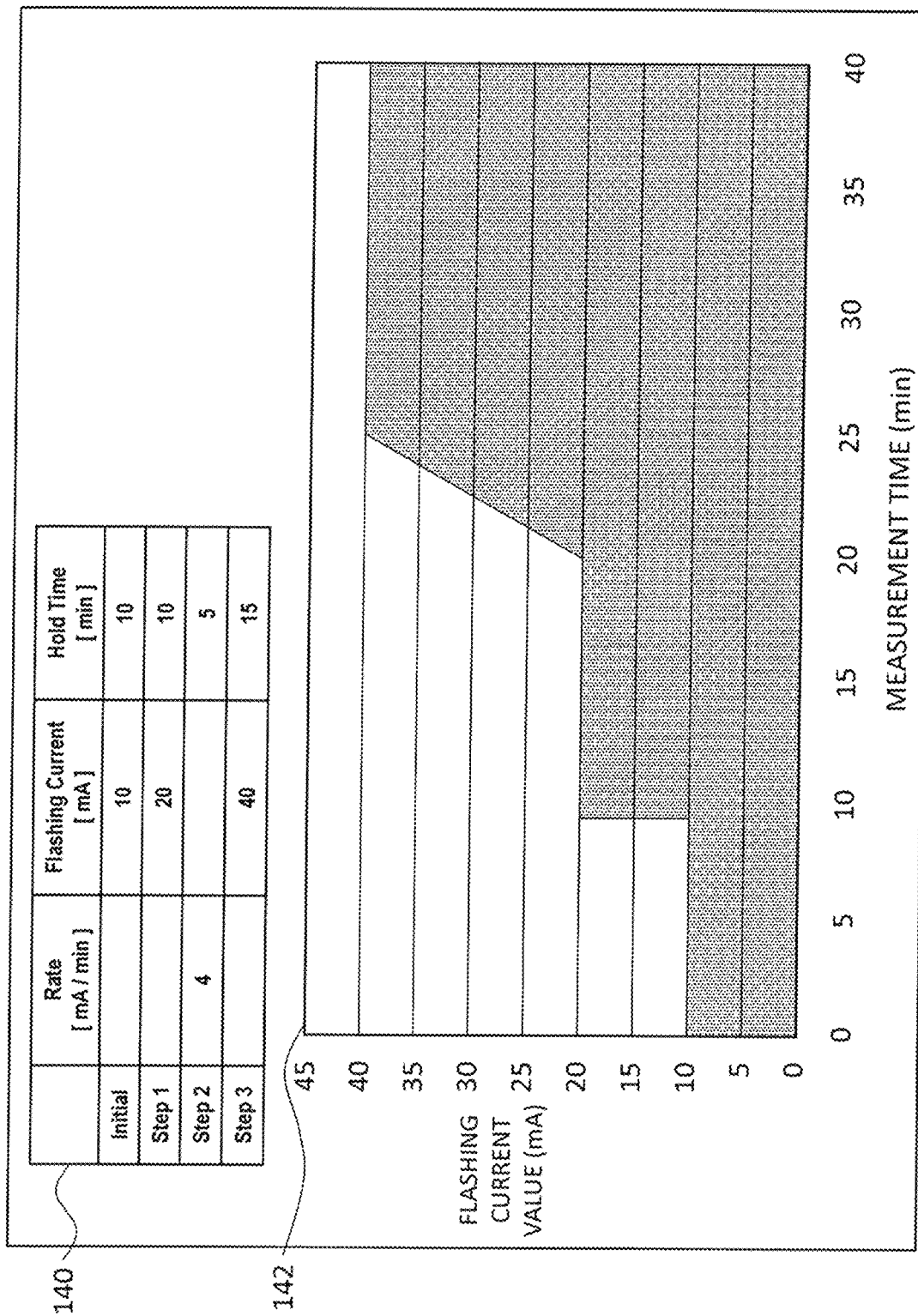
FIG. 11 is a diagram showing an example setting when a flashing current value is compositely increased.

FIG. 11 shows an example setting in which the flashing current value is controlled while combining holding at a constant value, a stepwise increase, and a continuous increase. In a numerical value setting table 140, settings are set in which the current is not increased for 10 minutes from the start and is set to 10 mA at the end (that is, the current is held at 10 mA for 10 minutes from the start) in an "Initial" field, the current is held at 20 mA for 10 minutes from the time 10 minutes after the start in a "Step 1" field, the current is to be increased at 4 mA/min. from the time 20 minutes after the start in a "Step 2" field, and the current is held at 40 mA for 15 minutes thereafter in a "Step 3" field. A graph 142 displays the change of the flashing current value according to this setting.

Figure 12:
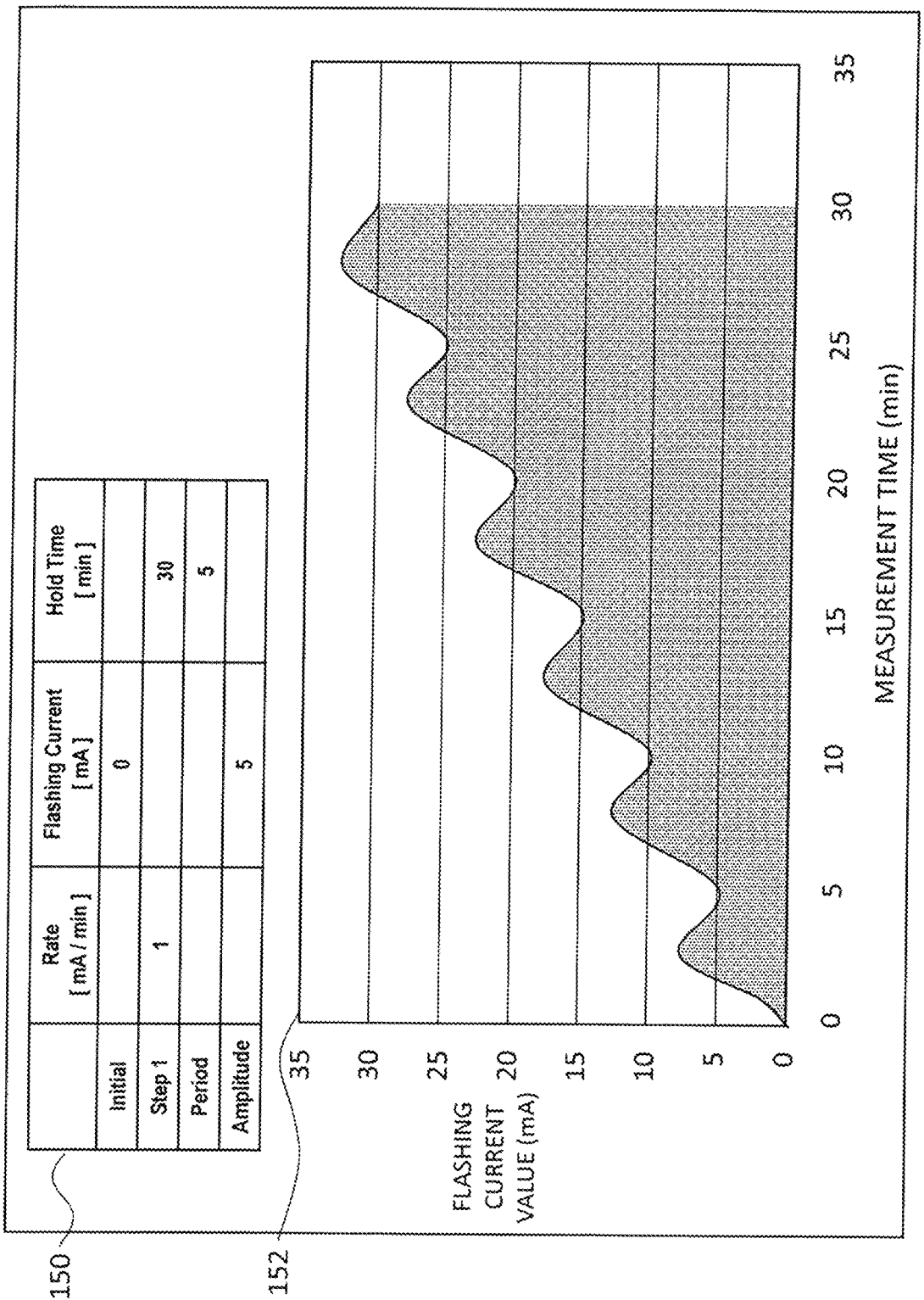
FIG. 12 is a diagram showing an example setting when a flashing current value is increased in a long term while the flashing current value is oscillated.

FIG. 12 shows an example setting in which the flashing current value is increased while oscillating with a time period of a few minutes. In a numerical value setting table 150, a setting is made in which the flashing current value is set to be continuously increased for 30 minutes (Hold Time) at a rate (Rate) of 1 mA/min. from 0 mA (Initial) at the start to a final value of 30 mA (Step 1), and an oscillation of a trigonometric function is superposed, with a period (Period) of 5 minutes and an amplitude (Amplitude) of 5 mA. In this setting, as shown in a graph 152, the flashing current value is gradually increased while the flashing current value is repeatedly increased and decreased with a period of 5 minutes.

Figure 13:
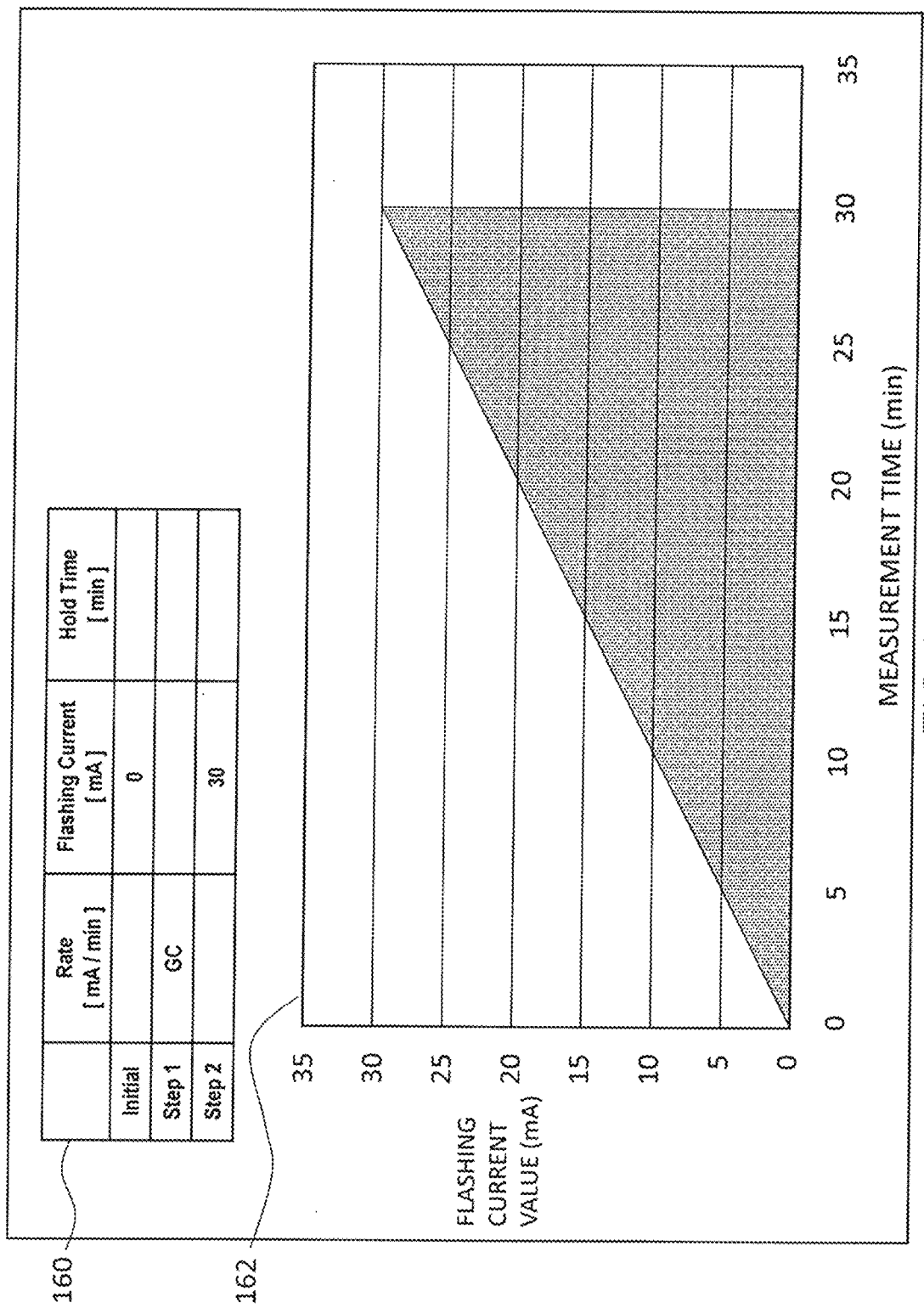
FIG. 13 is a diagram showing an example setting when a flashing current value is increased in a similar pattern to that of a temperature control of a gas chromatograph.

FIG. 13 shows an example setting in which the flashing current value is set similarly as a temperature increase pattern of the oven 22 of the GC unit 20. Here, a case is considered in which the oven 22 is set such that the temperature is linearly increased with a constant amount of change with respect to time over 30 minutes. In a numerical value setting table 160, a choice of "set current increase in similar pattern as temperature increase pattern of gas chromatograph" (shown as "GC") is input or selected in a "Rate" field (Step 1). For the flashing current value (Flashing Current), a current of 0 mA at the start (Initial) and a current of 30 mA at the end are set (Step 2). As a result, as shown in a graph 162, the flashing current value is linearly increased from 0 mA to 30 mA in synchronization with the temperature increase time of the gas chromatograph (here, over 30 minutes).

(3-2) Change of Flashing Time of Flashing Current

Next, an example configuration in which the flashing time is changed will be described. As described above, the amount of current of the flashing current can be increased and the flashing temperature can consequently be increased also by changing the flashing time (that is, electricity application time). The change of the flashing time can be set by preparing a setting screen similar to the setting screen 90b shown in FIG. 6B, and by setting on the setting screen. Specifically, the user sets the flashing current value at a constant (for example, 40 mA), and selects the pattern data of the flashing time to change the flashing time.

Figure 14:
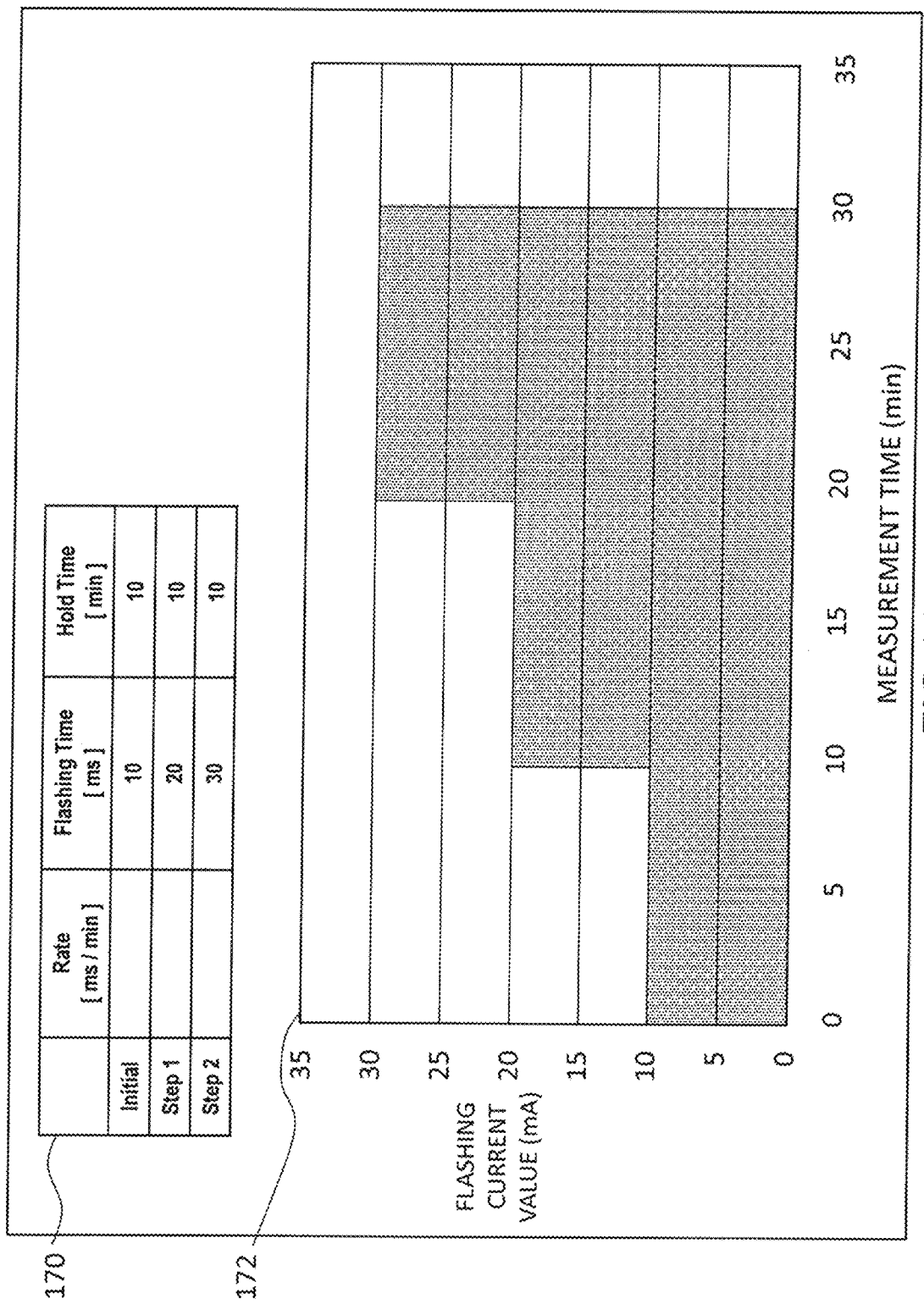
FIG. 14 is a diagram showing an example setting when a flashing time is stepwise extended.

FIG. 14 shows an example setting in a case where the user selects pattern data to stepwise increase the flashing time. In this case, a numerical value setting table 170 shown in the figure is displayed, and the user is requested to input a numerical value. Here, an input is made so that the flashing time (Flashing Time) is set at 10 milliseconds from 0 minute to 10 minutes (Initial), the flashing time is set at 20 milliseconds from 10 minutes to 20 minutes (Step 1), and the flashing time is set at 30 milliseconds from 20 minutes to 30 minutes (Step 2). In addition, 10 minutes is input for the hold time (Hold Time) of the flashing times. On a graph 172, a change with respect to time of the flashing time according to this setting is drawn. In FIG. 14, the flashing time is increased in two stages within the measurement time, but alternatively, the flashing time may be increased in one stage or in three or more stages by changing the input to the numerical value setting table 170.

The change of the flashing time may be performed in various other patterns. As a specific example, cases may be exemplified in which the change pattern of the flashing time is set similarly as the change patterns of the flashing current value shown in FIGS. 9~13. That is, for example, a configuration may be employed in which the flashing time is continuously increased, corresponding to FIG. 9, or a configuration may be employed in which the flashing time is started at a constant value, increased in an intermediate period by a constant ratio, and held at a constant value at the end, corresponding to FIG. 10. Alternatively, for example, a configuration may be employed in which control is applied while combining the holding the flashing time at a constant value, a stepwise increase, and a continuous increase, corresponding to FIG. 11, a configuration may be employed in which the flashing time is extended while the flashing time is oscillated at a time period of a few minutes, corresponding to FIG. 12, or a configuration may be employed in which the flashing time is set similarly as the temperature increase pattern of the oven 22 of the GC unit 20, corresponding to FIG. 13.

As described above, the numerical value setting tables shown in FIGS. 7 to 14 are stored in the pattern data storage 54 when a file name is input to the item 91 of FIG. 6B, and the Save button 97b of FIG. 6B is pressed. When the mass spectrometry is performed by the GC unit 20 and the MS unit 30 while changing the "Flashing Current" and the "Flashing Time" using these numerical setting tables, a file name (file name which is input to the item 91 of FIG. 6B) of the numerical value setting table to be called is input or selected on another screen (not shown). With this process, the flashing current controller 38 controls the flashing current value and the flashing time of the emitter of the ion source 32 according to the setting of the file during the mass spectrometry. In the mass spectrometry performed while designating the numerical value setting table in this manner, in place of the values of the "Flashing Current" and the "Flashing Time" which are set as initial values in FIG. 6A, use of the values of the numerical value setting table is prioritized. On the other hand, in the mass spectrometry which is performed while not designating the numerical value setting table, the values of the "Flashing Current" and the "Flashing Time" which are set as initial values in FIG. 6A are used.

The change of the flashing time may be performed in combination with the change of the flashing current value. In this case, in place of the setting screen 90b shown in FIG. 6B, a setting screen may be prepared which allows change of both the flashing current value and the flashing time, so that the user can easily change the setting. For the change pattern of the flashing current value and the change pattern of the flashing time, similar patterns (for example, the pattern of the flashing current value shown in FIG. 8 and the pattern of the flashing time shown in FIG. 14) may be used, or different patterns may be used.

(4) Mass Spectrometry Result

Next, with reference to FIGS. 15 and 16, a difference in the mass spectrometry result due to the difference in the flashing current will be described.

FIG. 15 is a diagram showing peak intensities (here, a height of the peak is set as the intensity, but alternatively, an area of the peak may be set as the intensity) with different flashing current values for specimens including n-Alkanes of C10~C40. The term "B.P." shows the boiling point, and the term "R.T." shows a retention time at the GC unit 20. For example, the boiling point of the alkane of C10 is 174.1° C., and the retention time is 2.51 minutes. For the n-Alkanes, the boiling point becomes higher as the number of carbons is increased, and the retention time is similarly increased (in the case of the column used in the experiment).

The fields of "5 mA", "10 mA", . . . "50 mA" in FIG. 15 show the TICC peak intensities of the alkanes in a state where the flashing current is fixed at 5 mA, 10 mA, . . . 50 mA. For example, at 5 mA, the peak intensity of the alkane of C10 was 1842380, and the peak intensity of the alkane of C12 was 4237300. Of the data of 5 mA, the data of a white background region shown by reference numeral 180 (that is, the data of the alkane of C10) shows that no peak tailing has occurred, and the detection precision was high. Data of a light gray region shown by reference numeral 182 (that is, data of the alkanes of C12~C36) shows that a peak was observed, but peak tailing has also occurred. The data of a dark gray region shown by reference numeral 184 shows that the peak was not detected.

When the flashing current is set at 10 mA, the data of C10 and C12 are in a region of a white text in a black background shown by reference numeral 186. This region shows that no peak tailing has occurred, and the largest value was obtained among the results of all flashing current values. Therefore, in the case of 10 mA, for C10 and C12, it can be said that the case was optimal, with ionization performed with high efficiency and the detection precision being high. In the example case of 10 mA, it can be understood that, for the alkanes of C14~C36, while a peak was detected, peak tailing has occurred. For C38 and C40, the peak was not detected, and peak tailing has occurred.

When the TICC peak intensities are observed for all flashing currents up to 50 mA, it can be said that the flashing current value of 10 mA is optimum for the alkanes of C10 and C12, the flashing current value of 25 mA is optimum for the alkane of C14, and the flashing current value of 35 mA is optimum for the alkane of C16. Further, it can be said that the flashing current value of 40 mA is optimum for the alkanes of C18 and C20, the flashing current of 45 mA is optimum for the alkanes of C22 and C24, and the flashing current of 50 mA is optimum for the alkanes of C26~C30. Therefore, it can be deduced that, by performing the flashing process to apply these flashing current values in the respective retention times of the respective alkanes, data can be obtained in which the peak intensity is maximized and no peak tailing occurs.

In the present embodiment, for example, when the boiling point of the injected specimen becomes higher as the time elapses, the user selects the pattern data of the flashing current value shown in FIGS. 8~11 and sets the numerical value to a suitable value, so that optimum or near-optimum flashing current value may be given. Further, when the boiling point of the injected specimen generally tends to become higher as the time elapses but the boiling point is sometimes slightly reduced during the process, the pattern data of the flashing current value as shown in FIG. 12 may be selected. The judgment of the selection of the pattern data may be performed by the PC unit 40, after inputting the data as shown in FIG. 15. Furthermore, when the mass spectrometry is to be performed for specimens having similar components every time, the optimum pattern data of the current value may be stored to enable quick calling of the optimum pattern data and performance of the measurement.

However, in general cases, at the stage before the mass spectrometry is performed, it is not understood what components are included in the specimen, and the retention times and the optimum flashing current values for the components are not known. Even in these cases, for example, when the mass spectrometry is to be performed for the specimen from a column which separates the components in the order of the boiling points, it can be deduced that a pattern is effective in which the flashing current value is set relatively low at the start of the measurement and the flashing current value is then increased. Thus, the user may select the pattern data of the flashing current value as shown in FIGS. 8~12, and may deductively set the numerical value, so that a relatively superior flashing current value may be given. Moreover, when deduction of the boiling point is difficult, it is effective to set the flashing current value similarly as the temperature increase pattern of the oven 22 of the GC unit 20, as shown in FIG. 13.

Further, during mass spectrometry for a certain specimen, the analysis state may be evaluated and the flashing current value may be changed according to the evaluation. With the use of the evaluation function by the peak evaluator 52 of the PC unit 40, such a flexible process according to the situation can be enabled.

FIG. 16 shows the TICC peak intensities obtained for the specimen including alkanes of C10~C40, similar to FIG. 15. In this experiment, however, four cases are analyzed in which the flashing current value was fixed at 40 mA, and the flashing time for application of the flashing current was set respectively to 30 milliseconds, 40 milliseconds, 50 milliseconds, and 60 milliseconds. The application period of the flashing current was 300 milliseconds for all cases.

When the flashing time is 30 milliseconds, the data of the alkanes of C10~C20 are in a white background region shown by reference numeral 190, and peak tailing has not occurred. However, the data of the alkanes of C22~C40 are in a light gray region shown by reference numeral 192, and peak tailing has occurred.

When the flashing time is set at 40 milliseconds, no peak tailing has occurred for the alkanes of C10~C24. In addition, when the flashing time is set at 50 milliseconds, no peak tailing has occurred for the alkanes of C10~C30, and, when the flashing time is set at 60 milliseconds, no peak tailing has occurred for the alkanes of C10~C36.

In this manner, even when the flashing current is set constant, the flashing time may be elongated to prevent occurrence of the peak tailing and to improve the detection precision. Therefore, as described above in section (3-2), a configuration to change the flashing time during the measurement period is effective. In general, the Joule's heat when the flashing current is set at constant is proportional to the flashing time. Thus, if the cooling effect is ignored, the increase in the temperature of the emitter can be considered to be proportional to the flashing time. When the actual temperature is to be accurately estimated, however, the cooling effect during this period is also taken into consideration.

In the above description, a specific configuration has been described in order to facilitate understanding. However, the specific configurations merely exemplify the embodiment, and various other embodiments are also possible.

The invention claimed is:

1. A mass spectrometry apparatus comprising:
an emitter that applies an electric field to an injected specimen to ionize the injected specimen;
a flashing processor that repeatedly performs a flashing process to increase a temperature of the emitter at a short-time interval during an injection period of the injected specimen; and
a mass spectrometry unit that performs mass spectrometry of the injected specimen ionized by the emitter, wherein
the flashing processor increases, during the injection period and in a long term, a flashing temperature which the emitter reaches during the temperature increasing process,
the flashing processor performs the flashing process by applying a flashing current to the emitter, and increases the flashing temperature in the long term by increasing an amount of electric power of the flashing current in the long term, and
the flashing processor increases the amount of the electric power of the flashing current in the long term while varying the amount of the electric power of the flashing current in a time interval longer than the short-time interval and shorter than the injection period.

2. A mass spectrometry apparatus comprising:
an emitter that applies an electric field to an injected specimen to ionize the injected specimen;
a flashing processor that repeatedly performs a flashing process to increase a temperature of the emitter at a short-time interval during an injection period of the injected specimen, wherein the flashing processor increases, during the injection period and in a long term, a flashing temperature which the emitter reaches during the temperature increasing process and the flashing processor performs the flashing process by applying a flashing current to the emitter, and increases the flashing temperature in the long term by increasing an amount of electric power of the flashing current in the long term;
a mass spectrometry unit that performs mass spectrometry of the injected specimen ionized by the emitter;
a presenter that presents to a user a plurality of electric power increasing patterns for increasing the amount of the electric power of the flashing current in the long term; and
a receiver that receives an electric power increasing pattern selected by the user, wherein
the flashing processor increases the amount of the electric power of the flashing current in the long term according to the electric power increasing pattern received by the receiver.

3. A flashing current control apparatus which is a control apparatus of an emitter which applies an electric field to an injected specimen to ionize the injected specimen, comprising:
a flashing processor that repeatedly performs, at a short-time interval during an injection period of the injected specimen, a flashing process to increase a temperature of the emitter by applying a flashing current to the emitter, wherein
the flashing processor increases an amount of electric power of the flashing current during the injection period and in a long term, and
the flashing processor increases the amount of the electric power of the flashing current in the long term while varying the amount of the electric power of the flashing current in a time interval longer than the short-time interval and shorter than the injection period.

* * * * *